US012649802B2

(12) United States Patent
Mather et al.

(10) Patent No.: US 12,649,802 B2
(45) Date of Patent: Jun. 9, 2026

(54) POLYMERS, METHODS OF MAKING POLYMERS, AND METHODS OF COUPLING OLIGONUCLEOTIDES TO POLYMERS

(71) Applicant: ILLUMINA, INC., San Diego, CA (US)

(72) Inventors: Brian Mather, San Diego, CA (US); Weixian Xi, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 1001 days.

(21) Appl. No.: 17/686,828

(22) Filed: Mar. 4, 2022

(65) Prior Publication Data

US 2022/0289876 A1 Sep. 15, 2022

Related U.S. Application Data

(60) Provisional application No. 63/158,470, filed on Mar. 9, 2021.

(51) Int. Cl.
*C08F 8/30* (2006.01)
*C08F 220/56* (2006.01)

(52) U.S. Cl.
CPC .............. *C08F 8/30* (2013.01); *C08F 220/56* (2013.01)

(58) Field of Classification Search
None
See application file for complete search history.

(56) References Cited

U.S. PATENT DOCUMENTS 6,033,784 A 3/2000 Jacobsen et al.
9,994,687 B2 6/2018 Berti et al.
11,913,067 B2 * 2/2024 Fisher .................. C12Q 1/6869
2005/0148027 A1 7/2005 Pirrung et al.
2006/0008840 A1 1/2006 Goldberg et al.
2007/0255054 A1 11/2007 Kuimelis et al.
2008/0206752 A1 * 8/2008 Balakirev ........ G01N 33/54353 435/6.11
2012/0053299 A1 3/2012 Popik et al.
(Continued)

FOREIGN PATENT DOCUMENTS

CN 101298464 A 11/2008
CN 101360834 A 2/2009
(Continued)

OTHER PUBLICATIONS

International Search Report and Written Opinion for PCT/US2022/018909 dated Aug. 16, 2022; 21 pages.
(Continued)

*Primary Examiner* — Sanza L. McClendon

(74) *Attorney, Agent, or Firm* — Sheppard, Mullin, Richter & Hampton LLP; Jaime D. Choi

(57) ABSTRACT

In some examples, a method of coupling oligonucleotides to a polymer is provided. Inactive moieties in a first region of a polymer may be selectively irradiated with light, while inactive moieties in a second region of the polymer are not irradiated, to generate first active moieties in the first region of the polymer. The first active moieties may be coupled to first oligonucleotides. The inactive moieties in the second region of the polymer may be irradiated with light to generate second active moieties in the second region of the polymer. The second active moieties may be coupled to second oligonucleotides.

22 Claims, 10 Drawing Sheets

(56) References Cited

U.S. PATENT DOCUMENTS

| | | | | |
|---|---|---|---|---|
| 2012/0122737 | A1* | 5/2012 | Sabot .................. | C12Q 1/6806 506/40 |
| 2018/0195950 | A1 | 7/2018 | Tsay et al. | |

FOREIGN PATENT DOCUMENTS

| | | | |
|---|---|---|---|
| CN | 101024856 | B | 12/2012 |
| CN | 110055318 | A | 7/2019 |
| EP | 2859055 | | 12/2013 |
| FR | 2737012 | A1 | 1/1997 |
| WO | 2006084482 | A1 | 8/2006 |
| WO | 2013012440 | A1 | 1/2013 |
| WO | 2013184796 | A1 | 12/2013 |
| WO | 2015002813 | A1 | 1/2015 |
| WO | 2020097005 | A1 | 5/2020 |
| WO | 2021028815 | A1 | 2/2021 |

OTHER PUBLICATIONS

Arumugam et al., "Patterned Surface Derivatization Using Diels-Alder Photoclick Reaction", Journal of the American Chemical Society 133(39):15730-15736 (Sep. 9, 2011).

Arumugam et al., "Photo-click chemistry strategies for spatiotemporal control of metal-free ligation, labeling, and surface derivatization", Pure & Applied Chemistry 85(7):1499-1513 (May 23, 2013).

Bjerknes et al., "Facile Quenching and Spatial Patterning of Cylooctynes via Strain-Promoted Alkyne-Azide Cycloaddition of Inorganic Azides", Bioconjugate Chemistry 28(5):1560-1565 (May 9, 2017).

Chrisey et al., "Fabrication of patterned DNA surfaces", Nucleic Acids Research 24(15):3040-3047 (Aug. 1, 1996).

Kumar et al., "Light-Triggered Click Chemistry", Chemical Reviews 121(12):6991-7031 (Oct. 26, 2020).

Mcnitt et al., "Multiphoton Activation of Photo-Strain-Promoted Azide Alkyne Cycloaddition "Click" Reagents Enables In Situ Labeling with Submicrometer Resolution", Journal of the American Chemical Society 139 (40):14029-14032 (Sep. 26, 2017).

Miyahara et al., "A Cu-free clickable surface with controllable surface density", Colloid & Polymer Science 297(6):927-931 (May 8, 2019).

Qu et al., "Cyclopropenone-masked dibenzocyclooctyne end-functionalized polymers from reversible addition-fragmentation chain transfer polymerization", Polymer 114:36-43 (Apr. 1, 2017).

Sun et al., "Well-defined cyclopropenone-masked dibenzocyclooctyne functionalized polymers from atom transfer readical polymerization", Polymer 64:202-209 (May 1, 2015).

Tasdelen et al., Externally stimulated click reactions for macromolecular syntheses:, Progress in Polymer Science 52:19-78 (Oct. 22, 2015).

Voelkerding et al., "Next-Generation Sequencing: From Basic Research to Diagnostics", Clinical Chemistry 55(4):641-658 (Feb. 26, 2009).

Kehagias et al. "Stamp replication for thermal and UV nanoimprint lithography using a UV-sensitive silsesquioxane esist"; Microelectronic Engineering; 86: 776-778 (2009).

Li et al. "A Dual Wavelength Polymerization and Bioconjugation Strategy for High Throughput Synthesis of Multivalent Ligands"; J. Am Chem. Soc. 2019, 141, 19823-19830.

Luo et al. "Investigation of Au SAMs Photoclick Derivatization by PM-IRRAS"; Langmuir 2020, 36, 1014-1022.

Orski et al. "High Density Orthogonal Surface Immobilization via Photoactivated Copper-Free Click Chemistry"; J. Am. chem. Soc. 2010, 132, 11024-11026.

Shao et al. "Diphenyl cyclopropenone-centered polymers for site-specific CO-releasing and chain dissociation"; Chinese Chemical Letters 31 (2020) 299-302.

Fairbanks et al., "Photoclick Chemistry: A Bright Idea," Chemical Reviews, 2021, 121(12):6915-6990.

Fodor et al., "Light-Directed, Spatially Addressable Parallel Chemical Synthesis," Science, 1991, 251(4995):767-773.

Huang et al., "Spatiotemporal patterning of photoresponsive DNA-based hydrogels to tune local cell response," Nature Communications, 2021, 12(1):2364.

Kaur et al., "Photochemical tuning of materials: A click chemistry perspective," Materials Today Chemistry, 2018, 8:56-84.

Manning et al., "Use of Oligonucleotides Carrying Photolabile Groups for the Control of the Deposition of Nanoparticles in Surfaces and Nanoparticle Association," International Journal of Molecular Sciences, 2011, 12:7238, 7249.

Situma et al., "Fabrication of DNA microarrays onto poly(methyl methacrylate) with ultraviolet patterning and microfluidics for the detection of low-abundant point mutations," Analytical Biochemistry, 2005, 340(1):123-135.

* cited by examiner

POLYMERS, METHODS OF MAKING POLYMERS, AND METHODS OF COUPLING OLIGONUCLEOTIDES TO POLYMERS

CROSS-REFERENCE TO RELATED APPLICATION

This application claims the benefit of U.S. Provisional Patent Application No. 63/158,470, filed on Mar. 9, 2021 and entitled "POLYMERS, METHODS OF MAKING POLYMERS, AND METHODS OF COUPLING OLIGONUCLEOTIDES TO POLYMERS", the entire contents of which are incorporated by reference herein.

FIELD

This application relates to compositions and methods for making polymers, and coupling oligonucleotides to polymers.

BACKGROUND

Cluster amplification is an approach to amplifying polynucleotides, for example for use in genetic sequencing. Target polynucleotides are captured by primers (e.g., P5 and P7 primers) coupled to a substrate surface in a flowcell, and form "seeds" at random locations on the surface.

Cycles of amplification are performed to form clusters on the surface around each seed. The clusters include copies, and complementary copies, of the seed polynucleotides. In some circumstances, the substrate is patterned so as to define regions that bound different clusters, such as wells that may be filled with respective clusters.

SUMMARY

Examples provided herein are related to polymers, methods of making polymers, and methods of coupling oligonucleotides to polymers.

Some examples herein provide a method of coupling oligonucleotides to a polymer. The method may include selectively irradiating inactive moieties in a first region of a polymer with light, while not irradiating inactive moieties in a second region of the polymer, to generate first active moieties in the first region of the polymer. The method may include coupling the first active moieties to first oligonucleotides. The method may include irradiating the inactive moieties in the second region of the polymer with light to generate second active moieties in the second region of the polymer. The method may include coupling the second active moieties to second oligonucleotides.

In some examples, the inactive moieties in the first region of the polymer or in the second region of the polymer include a cyclopropenone-masked dibenzocyclooctyne having the structure:

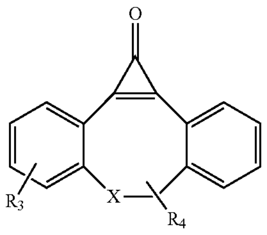

wherein one of $R_3$ and $R_4$ is $R_1$ and the other is H; wherein $R_1$ is a linkage to a backbone of the polymer; and wherein X is $CH_2$, O, S, or NH if $R_4$ is not directly coupled to X, or wherein X is CH or N if $R_4$ is directly coupled to X. In some examples, the first active moieties or the second active moieties include a dibenzocyclooctyne:

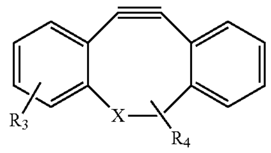

In some examples, the first oligonucleotides or second oligonucleotides are coupled to azides ($N_3$) that react with the dibenzocyclooctyne to form a cycloadduct having the structure:

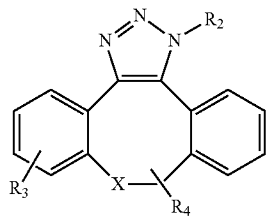

where $R_2$ represents the first oligonucleotides or the second oligonucleotides.

In some examples, the inactive moieties in the first region of the polymer or in the second region of the polymer include a tetrazole having the structure:

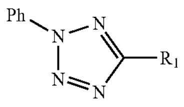

where $R_1$ represents a linkage to a backbone of the polymer. In some examples, the first active moieties or the second active moieties include nitrile imines having the structure:

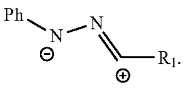

In some examples, the first oligonucleotides or second oligonucleotides are coupled to olefins that react with the first active moieties or the second active moieties to form a pyrazoline having the structure:

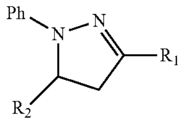

where $R_2$ represents the first oligonucleotides or the second oligonucleotides.

In some examples, the inactive moieties in the first region of the polymer or in the second region of the polymer include a 3-(hydroxymethyl)-2-naphthol having the structure:

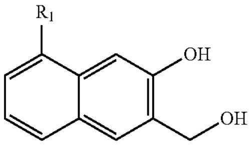

where $R_1$ represents a linkage to a backbone of the polymer. In some examples, the first active moieties or the second active moieties include a compound having the structure:

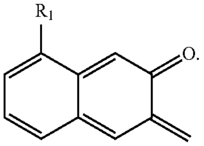

In some examples, the first oligonucleotides or second oligonucleotides are coupled to vinyl ethers that react with the first active moieties or the second active moieties to form a benzochroman having the structure:

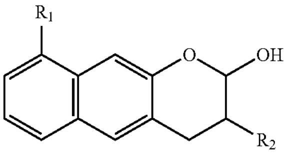

where $R_2$ represents the first oligonucleotides or the second oligonucleotides.

In some examples, the inactive moieties in the first region of the polymer or in the second region of the polymer include a 2H-azirine having the structure:

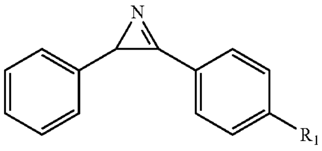

where $R_1$ represents a linkage to a backbone of the polymer. In some examples, the first active moieties or the second active moieties include a nitrile ylide having the structure:

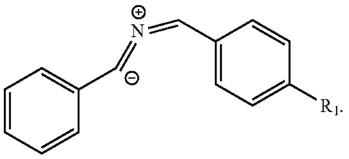

In some examples, the first oligonucleotides or second oligonucleotides are coupled to olefins that react with the first active moieties or the second active moieties to form a pyrroline having the structure:

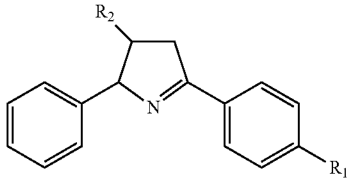

where $R_2$ represents the first oligonucleotides or the second oligonucleotides.

In some examples, the first oligonucleotides include a mixture of first primers lacking an excision moiety and second primers including an excision moiety. In some examples, the second oligonucleotides include a mixture of third primers including an excision moiety and fourth primers lacking an excision moiety. In some examples, the first and third primers have the same sequence as one another except for the excision moiety, and the second and fourth primers have the same sequence as one another except for the excision moiety. In some examples, the sequences of the first and second primers are orthogonal to one another, and the sequences of the third and fourth primers are orthogonal to one another.

In some examples, the first region of the polymer includes a plurality of first subregions, and the second region of the polymer includes a plurality of second subregions. In some examples, each of the first subregions is contiguous with a corresponding one of the second subregions. In some examples, each of the first subregions, and the corresponding one of the second subregions within which that first subregion is continuous, is located within a well.

In some examples, the method further includes depositing photoresist over the first and second regions. The method further may include, while selectively irradiating the inactive moieties in the first region of the polymer with light and while not irradiating the inactive moieties in the second region of the polymer, irradiating the photoresist over the first region with light. The method further may include, before coupling the first active moieties to the first oligonucleotides, removing the irradiated photoresist from the first region of the polymer. The method further may include, before coupling the second active moieties to the second oligonucleotides, removing the photoresist from the second region of the polymer.

In some examples, the irradiated photoresist is removed from the first region of the polymer and the photoresist is removed from the second region of the polymer.

Some examples herein provide a polymer, including a poly(cyclopropenone-masked dibenzocyclooctyne-acrylamide-co-acrylamide) copolymer having the structure:

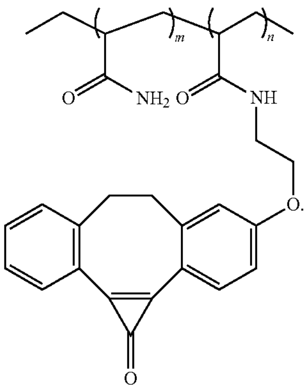

Some examples herein provide a polymer, including a poly(dibenzocyclooctyne-acrylamide-co-acrylamide) copolymer having the structure:

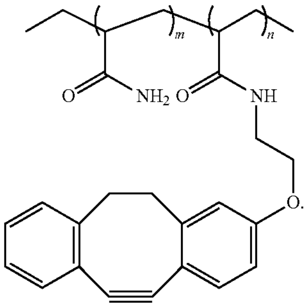

Some examples herein provide a method of making a polymer. The method may include the radical-induced polymerization reaction:

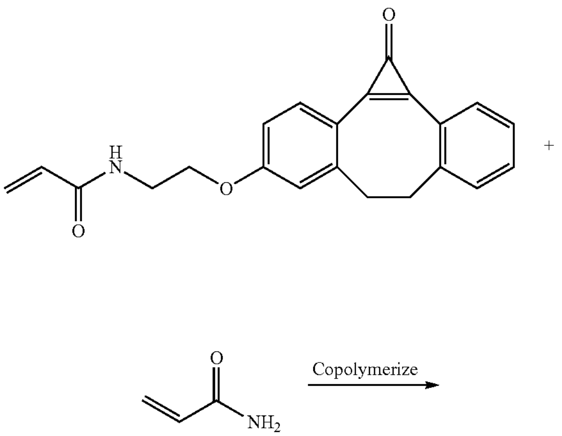

-continued

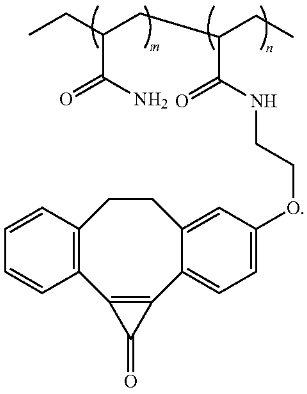

Some examples herein provide a method of making a polymer. The method may include the light-induced reaction:

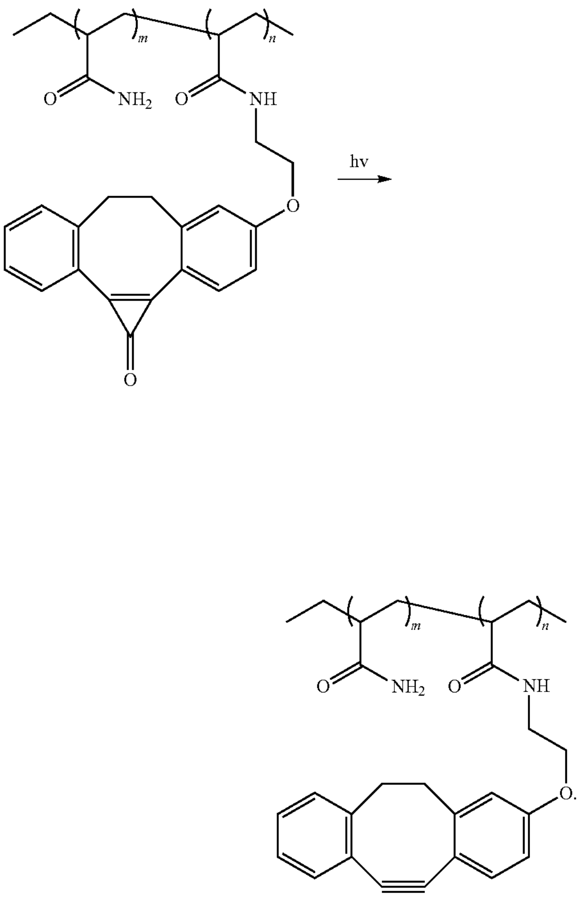

Some examples herein provide a polymer including the structure:

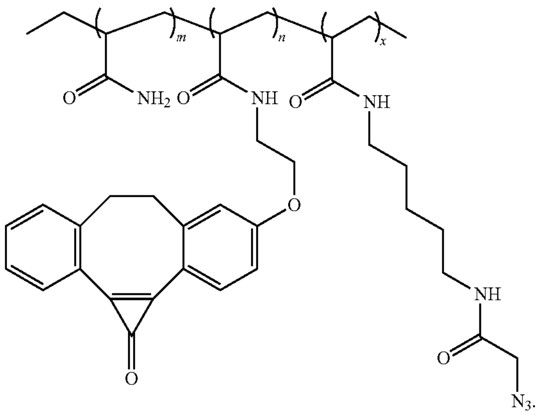

Some examples herein provide a method of making a polymer. The method may include the radical-induced polymerization reaction:

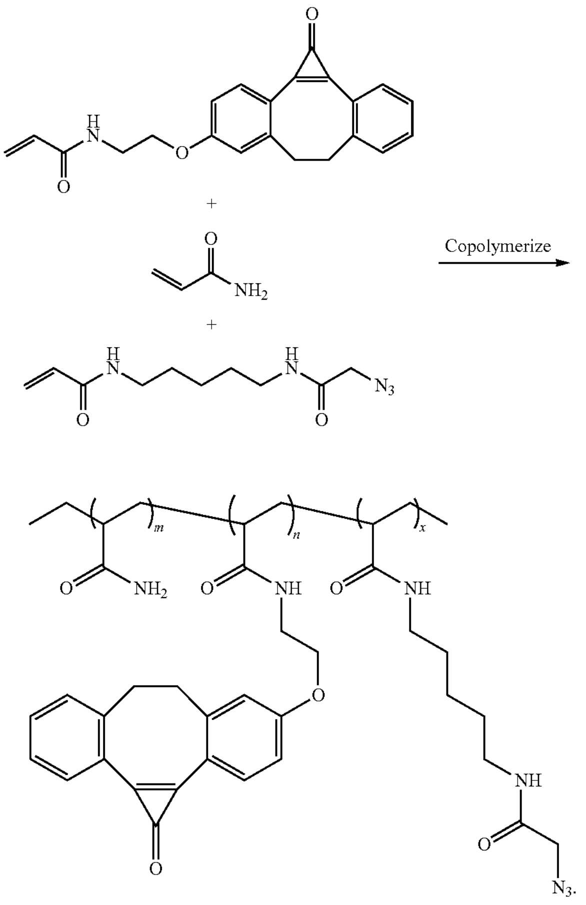

Some examples herein provide a method of functionalizing a substrate. The method may include providing a substrate including norbornene groups:

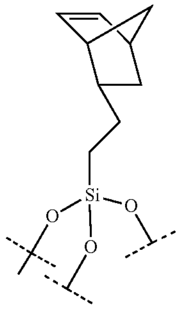

where the dotted lines represent the surface of the substrate. The method may include depositing onto the substrate a polymer including the structure:

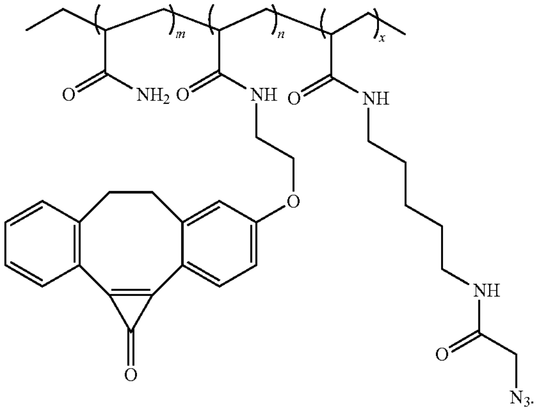

The method may include reacting the azide ($N_3$) groups of the polymer with the norbornene groups to couple the polymer to the substrate.

In some examples, the method further includes making the polymer using the above method. In some examples, the method further includes using light to convert the cyclopropenone-masked dibenzocyclooctyne to dibenzocyclooctyne:

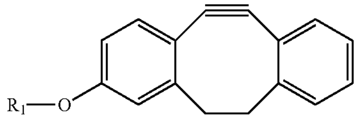

where $R_1$ represents a linkage to the backbone of the polymer. In some examples, the method further includes reacting the dibenzocyclooctyne with an azide ($N_3$) coupled to an oligonucleotide ($R_2$) to form a tetrazole having the structure:

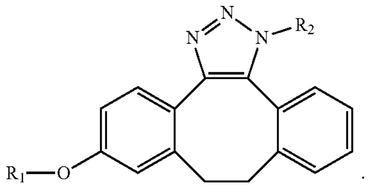

Some examples herein provide a composition made using operations including coupling a polymer to a substrate using the above method.

Some examples herein provide a composition that includes any of the polymers described above, disposed on a substrate.

Some examples herein provide a polymer having the structure:

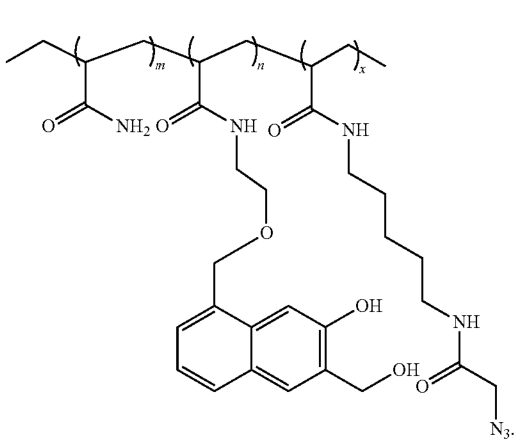

Some examples herein provide a method of making a polymer. The method may include the radical-induced copolymerization reaction:

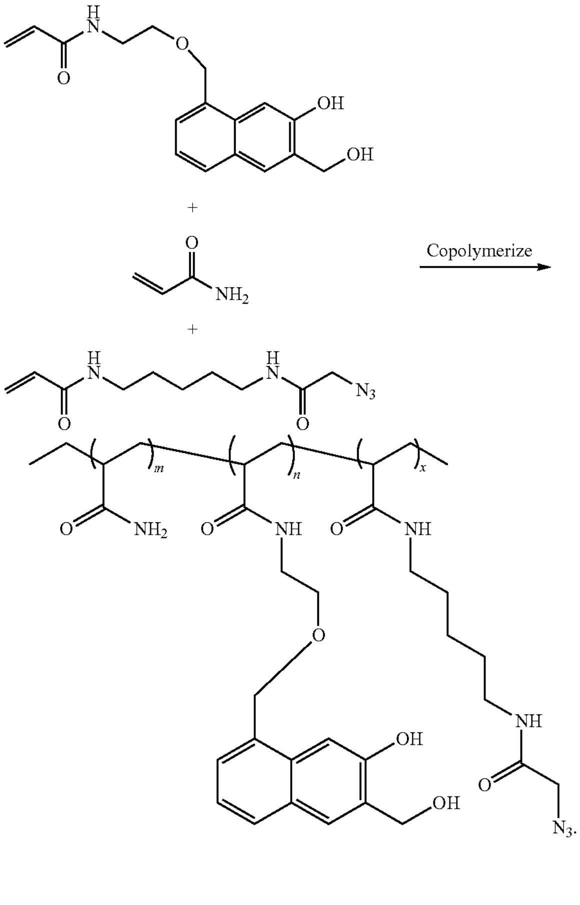

Some examples herein provide a method of functionalizing a substrate, the method may include providing a substrate including norbornene groups:

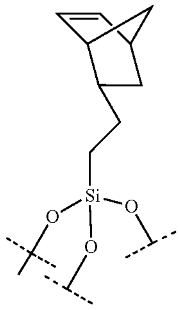

where the dotted lines represent the surface of the substrate. The method may include depositing onto the substrate a polymer including the structure:

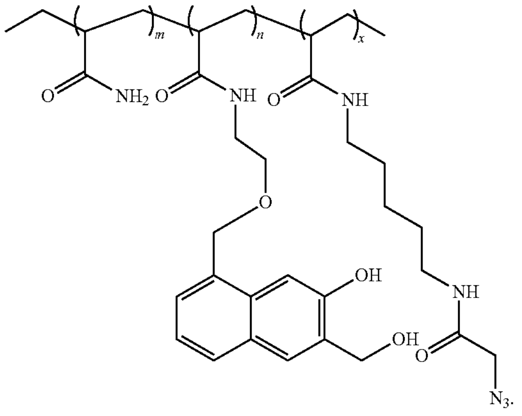

The method may include reacting the azide ($N_3$) groups of the polymer with the norbornene groups to couple the polymer to the substrate.

Some examples herein provide a composition made by coupling a polymer to a substrate using the above method.

Some examples herein provide a method of functionalizing a polymer. The method may include converting the 3-(hydroxymethyl)-2-naphthol of the above composition to an active moiety using light. The method may include reacting the active moiety with azide-coupled oligonucleotides to couple the oligonucleotides to the polymer.

Some examples herein provide a polymer having the structure:

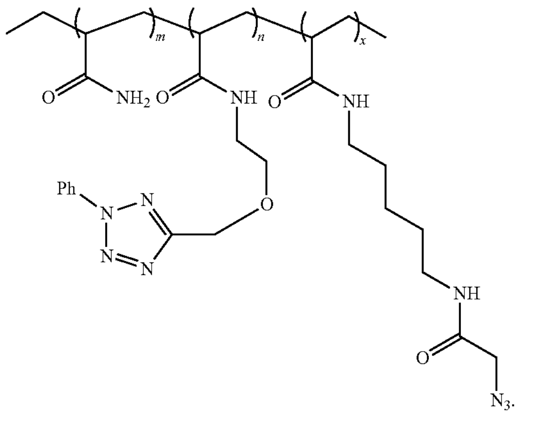

Some examples herein provide a method of making a polymer. The method may include the radical-induced copolymerization reaction:

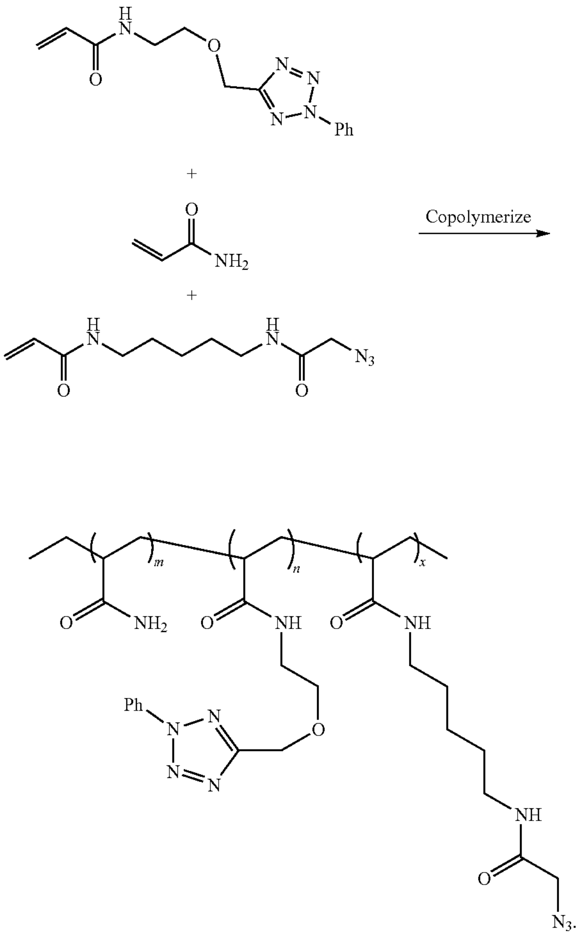

Some examples herein provide a method of functionalizing a substrate. The method may include providing a substrate including norbornene groups:

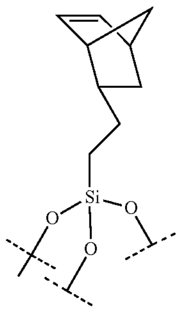

where the dotted lines represent the surface of the substrate. The method may include depositing onto the substrate a polymer including the structure:

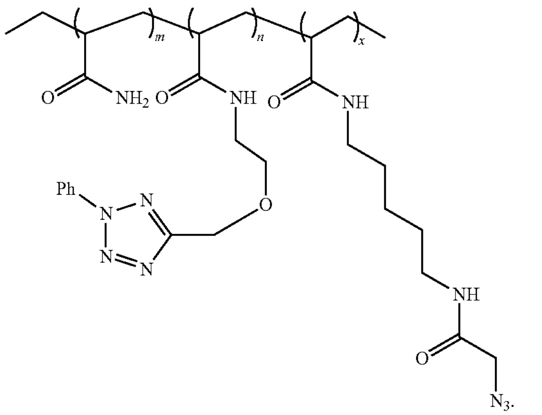

The method may include reacting the azide ($N_3$) groups of the polymer with the norbornene groups to couple the polymer to the substrate.

Some examples herein provide composition made by coupling a polymer to a substrate using the above method.

Some examples herein provide a method of functionalizing a polymer. The method may include converting the tetrazole of the above composition to a nitrile imine active moiety using light. The method also may include reacting the nitrile imine active moiety with azide-coupled oligonucleotides to couple the oligonucleotides to the polymer.

Some examples herein provide a polymer having the structure:

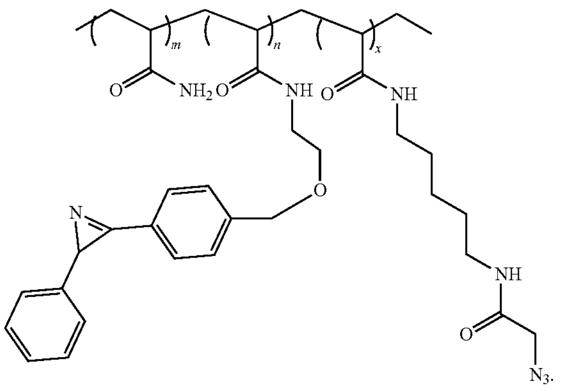

Some examples herein provide a method of making a polymer. The method may include the radical-induced copolymerization reaction:

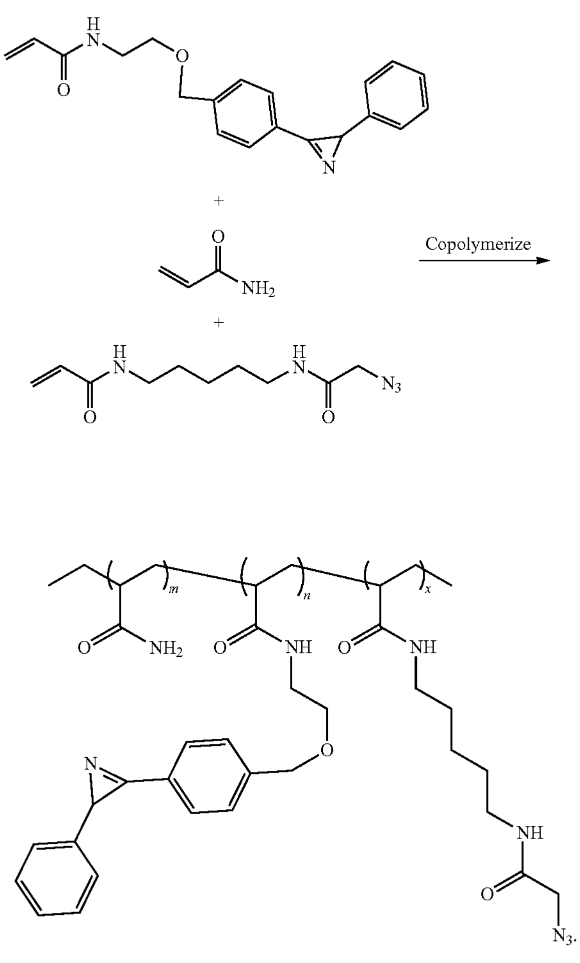

Some examples herein provide a method of functionalizing a substrate. The method may include providing a substrate including norbornene groups:

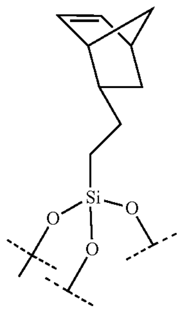

where the dotted lines represent the surface of the substrate. The method may include depositing onto the substrate a polymer including the structure:

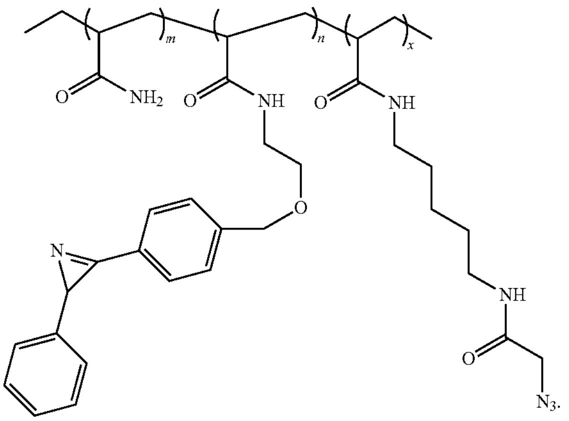

The method may include reacting the azide ($N_3$) groups of the polymer with the norbornene groups to couple the polymer to the substrate.

Some examples herein provide a composition made by coupling a polymer to a substrate using the above method.

Some examples herein provide method of functionalizing a polymer. The method may include converting the 2H-azirine of the above composition to a nitrile ylide active moiety using light. The method may include reacting the nitrile ylide active moiety with azide-coupled oligonucleotides to couple the oligonucleotides to the polymer.

Some examples herein provide a polymer having the structure:

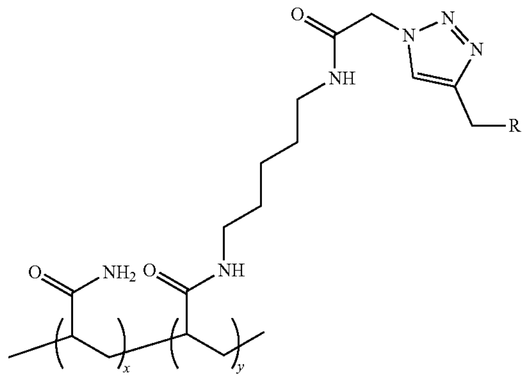

where R is selected from the group consisting of a cyclopropenone-masked dibenzocyclooctyne, a tetrazole, a 3-(hydroxymethyl)-2-naphthol, and a 2H-azirine.

Some examples herein provide a method of making a polymer. The method may include the click chemistry reaction of poly(N-(5-azidoacetamidylpentyl) acrylamide-co-acrylamide) (PAZAM) with a functionalized alkyne ( 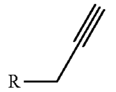 ):

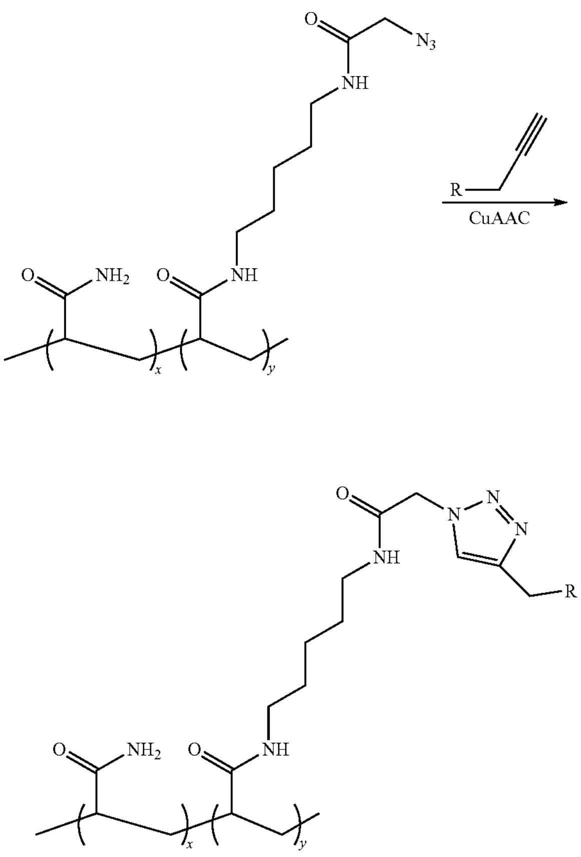

where

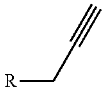

is selected from the group consisting of:

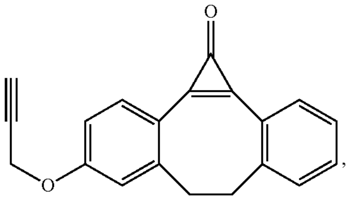
,

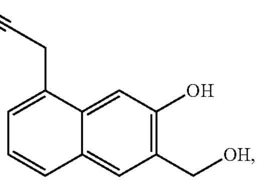

, and

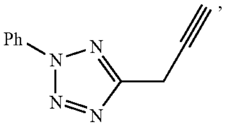

-continued

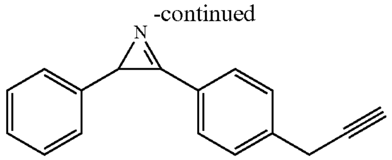
.

Some examples herein provide a method of functionalizing a polymer. The method may include using light to convert the cyclopropenone-masked dibenzocyclooctyne, tetrazole, 3-(hydroxymethyl)-2-naphthol, or 2H-azirine of the above polymer to an active moiety. The method may include reacting the active moiety with azide-coupled oligonucleotides to couple the oligonucleotides to the polymer.

Some examples herein provide a poly(N-(5-azidoacetamidylpentyl) acrylamide-co-acrylamide-co-N-(5-triazolylacetamidylpentyl) acrylamide) polymer having the structure:

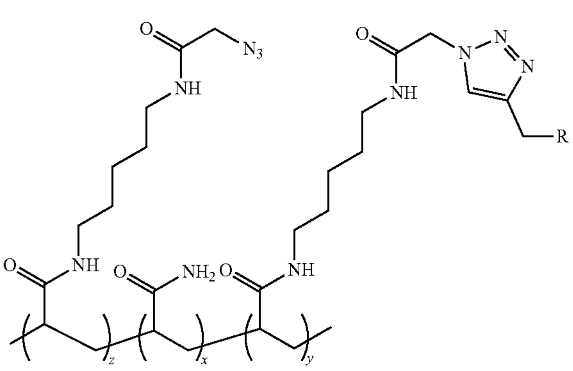

where R is selected from the group consisting of a cyclopropenone-masked dibenzocyclooctyne, a tetrazole, a 3-(hydroxymethyl)-2-naphthol, and a 2H-azirine.

Some examples herein provide a method of making a polymer. The method may include the click chemistry reaction of an azide functional polymer with a functionalized alkyne

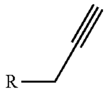
):

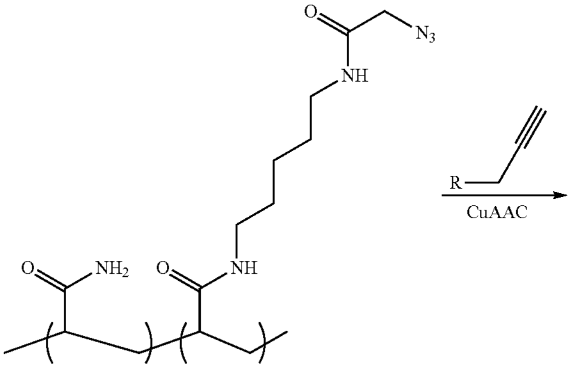

-continued

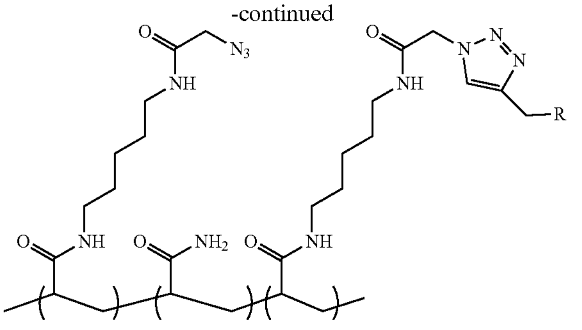

where

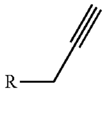

is selected from the group consisting of:

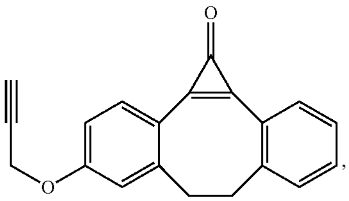

,

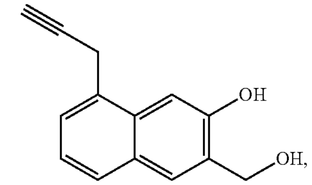

, and

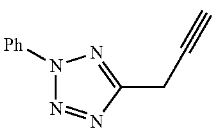

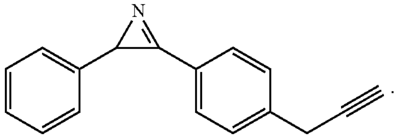

.

Some examples herein provide a method of functionalizing a polymer. The method may include using light to convert the cyclopropenone-masked dibenzocyclooctyne, tetrazole, 3-(hydroxymethyl)-2-naphthol, or 2H-azirine of the above polymer to an active moiety. The method may include reacting the active moiety with azide-coupled oligonucleotides to couple the oligonucleotides to the polymer.

Some examples herein provide a method of making a functional polymer coated surface wherein a norbornene silanized surface is reacted with azide functional polymer and then remaining azide groups are reacted with an inactive moiety coupled to an azide reactive group.

In some examples, the azide reactive group includes an alkyne group. In some examples, the inactive moiety is selected from the group consisting cyclopropenone-masked dibenzocyclooctyne, tetrazole, 3-(hydroxymethyl)-2-naphthol, and 2H-azirine.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

DETAILED DESCRIPTION

Examples provided herein are related to polymers, methods of making polymers, and methods of coupling oligonucleotides to polymers.

Figure 1:
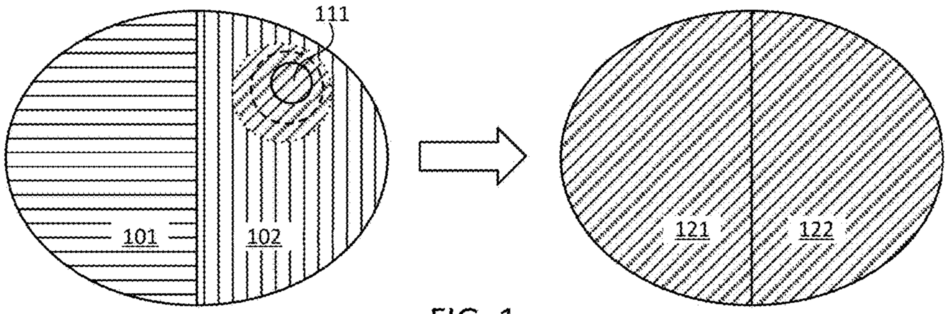
FIG. 1 schematically illustrates an example of amplifying polynucleotides on a substrate including different oligonucleotides in first and second regions of the substrate.

It may be desirable to perform sequencing-by-synthesis (SBS) using functionalized polymers to determine the sequence of target polynucleotides in a cluster. FIG. 1 schematically illustrates an example of amplifying polynucleotides on a substrate including different oligonucleotides in first and second regions of the substrate. The substrate may include a first region 101 and second region 102, which may be functionalized so as to include different oligonucleotides than one another in a manner such as described with reference to FIG. 2A. It may be desired to perform simultaneous paired-end reads on amplicons of the same target polynucleotide in both of regions 101, 102 so as to enhance reliability of the read, e.g., by performing SBS reads on the amplicons in a first direction in region 101 and in the opposite direction in region 102, and then using software to align the results, which should be complementary to one another and thus indicate the same sequence as one another. As shown in FIG. 1, capture and amplification of seed 111 (a target polynucleotide) on substrate region 102 (or, equivalently, substrate region 101) may results in a monoclonal cluster that substantially covers first region 121 and second region 122 and that readily may be used for simultaneous paired-end reads.

Figure 2A:
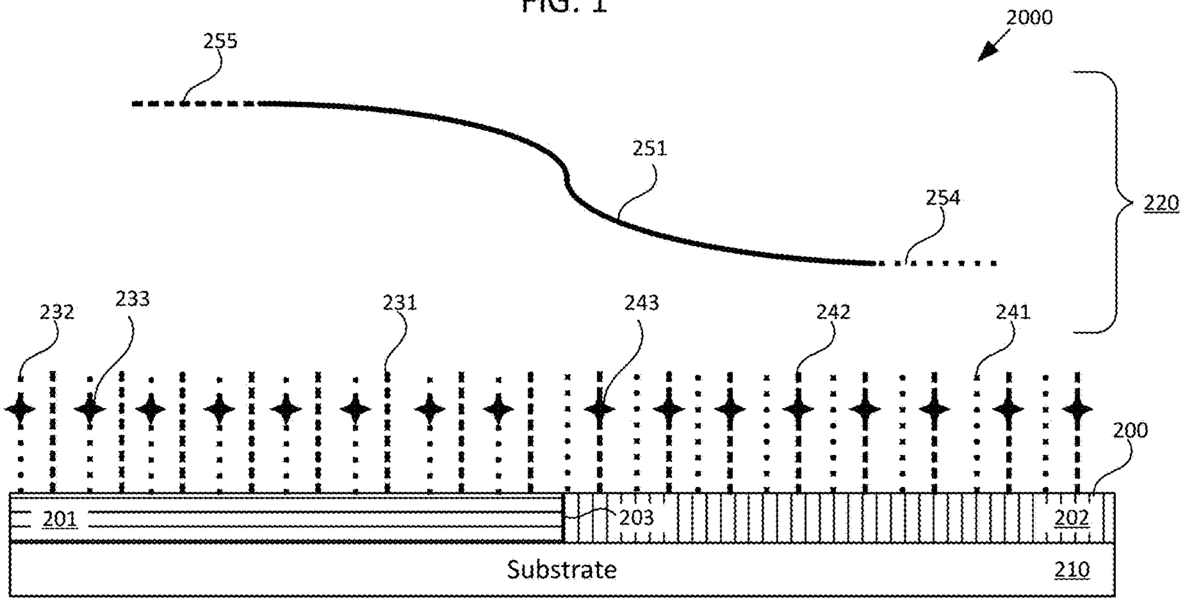
FIGS. 2A-2D schematically illustrate example compositions and operations in a process flow for amplifying a polynucleotide using different oligonucleotides in first and second regions of the substrate.

Functionalizing different regions of the substrate in different ways—such as providing different oligonucleotides in different regions of the substrate—may facilitate preparation of clusters of target nucleotides suitable for simultaneous paired-end reads. For example, FIGS. 2A-2D schematically illustrate example compositions and operations in a process flow for amplifying a polynucleotide using different oligonucleotides in first and second regions of the substrate. Referring first to FIG. 2A, composition 2000 includes substrate 200 and a plurality of oligonucleotides, such as primers, coupled thereto. In this example, substrate 200 includes first region 201 and second region 202, which may be adjacent to one another with interface 203 therebetween. First region 201 and second region 202 may be functionalized differently, more specifically having different capture primers coupled thereto. For example, capture primers 231 may be coupled to the first region 201 of substrate 200, and capture primers 241 may be coupled to the second region 202 of substrate 200. Capture primers 231 and 241 may have the same sequence as one another, except that capture primers 241 may include excision moieties 243 that may be used in a manner such a described below with reference to FIG. 2D. Orthogonal capture primers 232 may be coupled to first region 201 of substrate 200, and orthogonal capture primers 242 may be coupled to second region 202 of the substrate. Orthogonal capture primers 232 and 242 may have the same sequence as one another, except that orthogonal capture primers 232 may include excision moieties 233 that may be used in a manner such a described below with reference to FIG. 2D. Excision moieties 233, 243 may be located at any suitable position along the length of any suitable primer(s) and may be, but need not necessarily be, the same type of excision moiety as one another.

As shown in FIG. 2A, composition 2000 further may include a fluid 220 that includes target polynucleotide 251, e.g., a polynucleotide that is to be amplified and eventually sequenced. Target polynucleotide 251 may include first adapter 254 that is complementary to the orthogonal capture primers 232, 242, and a second adapter 255 that is complementary to the capture primers 231, 241. One or more of the capture primers (e.g., orthogonal capture primers 232 and 242) may include excision moieties such as 8-oxo-G which may be cleaved in a manner such as described with reference to FIG. 2D.

Figure 2B:
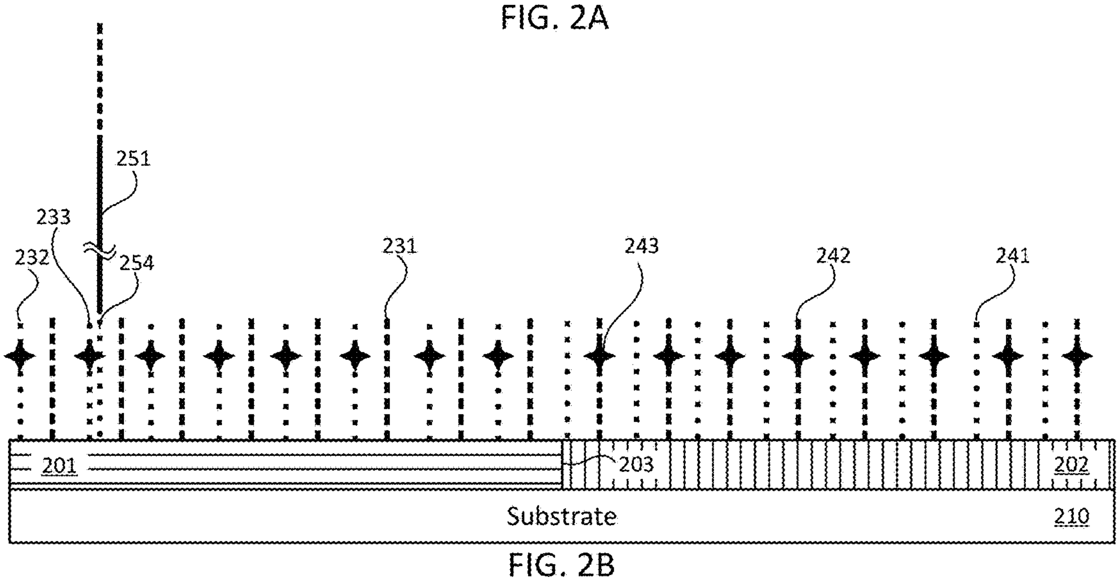
Figure 2C:
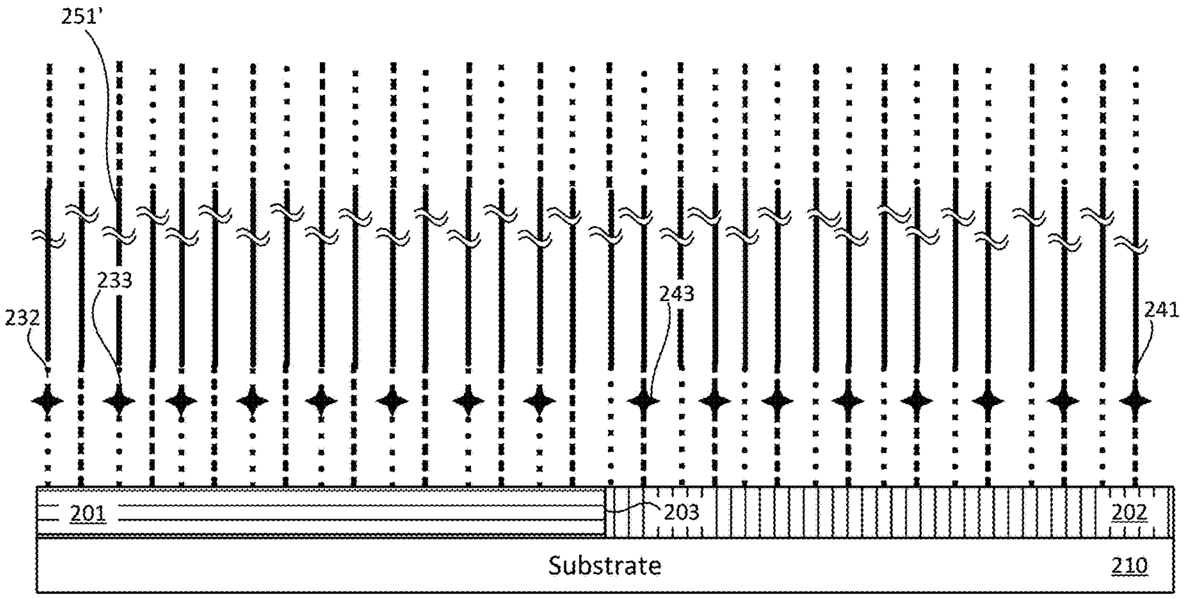
Figure 2D:
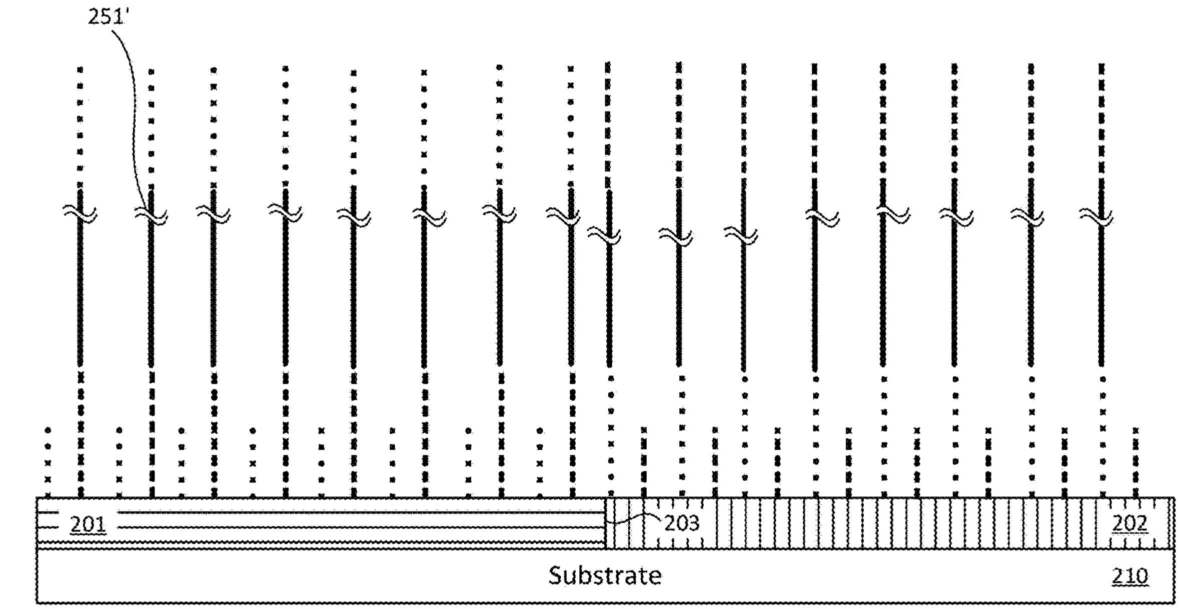

As illustrated in FIG. 2B, adapter 254 of target polynucleotide 251 may randomly hybridize to a capture primer 232 in region 201, but equivalently may hybridize to capture primer 242 in region 202. After such initial hybridization, first target polynucleotide 251 may be amplified using processes such as known in the art, e.g., using surface-bound polymerase chain reaction (PCR), bridge amplification, or a strand invasion process which may be referred to as ExAmp, forming amplicons 251' illustrated in FIG. 2C. If amplification operations are repeated until first and second substrate regions 201, 202 are substantially full, both adapters of the resulting amplicons may not necessarily be hybridized to corresponding capture primers or orthogonal capture primers, and as such the amplicons may extend linearly away from the substrate as illustrated in FIG. 2C. Portions of orthogonal capture primers 232 then may be removed by reacting a suitable enzyme or reagent with excision moieties 233, and portions of capture primers 241 may be removed by reacting a suitable enzyme or reagent with excision moieties 243. The enzyme or reagent used with excision moieties 233 may be the same as, or different than, the enzyme or reagent used with excision moieties 243. As illustrated in FIG. 2D, reaction of excision moieties 233 (shown in FIG. 2C) removes polynucleotides of one orientation in the first substrate region 201, and reaction of excision moieties 243 (shown in FIG. 2C) removes polynucleotides of the other orientation in the second substrate region 202, such that simultaneous paired-end reads may be performed in the two substrate regions.

The present application provides nonlimiting examples of methods of coupling different oligonucleotides (e.g., different primers) to different regions of a polymer than one another, e.g., for forming regions 101 and 102 described with reference to FIG. 1, or for forming regions 201 and 202 described with reference to FIG. 2, and also provides the polymers and methods for forming such polymers.

First, some terms used herein will be briefly explained. Then, some example methods for coupling oligonucleotides to polymers, and resulting compositions, will be described, followed by some example methods for forming polymers, and resulting polymers.

Terms

Unless defined otherwise, all technical and scientific terms used herein have the same meaning as is commonly understood by one of ordinary skill in the art. The use of the term "including" as well as other forms, such as "include," "includes," and "included," is not limiting. The use of the term "having" as well as other forms, such as "have," "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

The terms "substantially," "approximately," and "about" used throughout this specification are used to describe and account for small fluctuations, such as due to variations in processing. For example, they may refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

As used herein, "hybridize" is intended to mean noncovalently associating a first polynucleotide to a second polynucleotide along the lengths of those polymers to form a double-stranded "duplex." For instance, two DNA polynucleotide strands may associate through complementary base pairing. The strength of the association between the first and second polynucleotides increases with the complementarity between the sequences of nucleotides within those polynucleotides. The strength of hybridization between polynucleotides may be characterized by a temperature of melting (Tm) at which 50% of the duplexes have polynucleotide strands that disassociate from one another. Polynucleotides that are "partially" hybridized to one another means that they have sequences that are complementary to one another, but such sequences are hybridized with one another along only a portion of their lengths to form a partial duplex. Polynucleotides with an "inability" to hybridize include those which are physically separated from one another such that an insufficient number of their bases may contact one another in a manner so as to hybridize with one another.

As used herein, the term "nucleotide" is intended to mean a molecule that includes a sugar and at least one phosphate group, and in some examples also includes a nucleobase. A nucleotide that lacks a nucleobase may be referred to as "abasic." Nucleotides include deoxyribonucleotides, modified deoxyribonucleotides, ribonucleotides, modified ribonucleotides, peptide nucleotides, modified peptide nucleotides, modified phosphate sugar backbone nucleotides, and mixtures thereof. Examples of nucleotides include adenosine monophosphate (AMP), adenosine diphosphate (ADP), adenosine triphosphate (ATP), thymidine monophosphate (TMP), thymidine diphosphate (TDP), thymidine triphosphate (TTP), cytidine monophosphate (CMP), cytidine diphosphate (CDP), cytidine triphosphate (CTP), guanosine monophosphate (GMP), guanosine diphosphate (GDP), guanosine triphosphate (GTP), uridine monophosphate (UMP), uridine diphosphate (UDP), uridine triphosphate (UTP), deoxyadenosine monophosphate (dAMP), deoxyadenosine diphosphate (dADP), deoxyadenosine triphosphate (dATP), deoxythymidine monophosphate (dTMP), deoxythymidine diphosphate (dTDP), deoxythymidine triphosphate (dTTP), deoxycytidine diphosphate (dCDP), deoxycytidine triphosphate (dCTP), deoxyguanosine monophosphate (dGMP), deoxyguanosine diphosphate (dGDP), deoxyguanosine triphosphate (dGTP), deoxyuridine monophosphate (dUMP), deoxyuridine diphosphate (dUDP), and deoxyuridine triphosphate (dUTP).

As used herein, the term "nucleotide" also is intended to encompass any nucleotide analogue which is a type of nucleotide that includes a modified nucleobase, sugar and/or phosphate moiety compared to naturally occurring nucleotides. Example modified nucleobases include inosine, xathanine, hypoxathanine, isocytosine, isoguanine, 2-aminopurine, 5-methylcytosine, 5-hydroxymethyl cytosine, 2-aminoadenine, 6-methyl adenine, 6-methyl guanine, 2-propyl guanine, 2-propyl adenine, 2-thiouracil, 2-thiothymine, 2-thiocytosine, 15-halouracil, 15-halocytosine, 5-propynyl uracil, 5-propynyl cytosine, 6-azo uracil, 6-azo cytosine, 6-azo thymine, 5-uracil, 4-thiouracil, 8-halo adenine or guanine, 8-amino adenine or guanine, 8-thiol adenine or guanine, 8-thioalkyl adenine or guanine, 8-hydroxyl adenine or guanine, 5-halo substituted uracil or cytosine, 7-methylguanine, 7-methyladenine, 8-azaguanine, 8-azaadenine, 7-deazaguanine, 7-deazaadenine, 3-deazaguanine, 3-deazaadenine or the like. As is known in the art, certain nucleotide analogues cannot become incorporated into a polynucleotide, for example, nucleotide analogues such as adenosine 5'-phosphosulfate. Nucleotides may include any suitable number of phosphates, e.g., three, four, five, six, or more than six phosphates.

As used herein, the term "polynucleotide" refers to a molecule that includes a sequence of nucleotides that are bonded to one another. A polynucleotide is one nonlimiting example of a polymer. Examples of polynucleotides include deoxyribonucleic acid (DNA), ribonucleic acid (RNA), and analogues thereof. A polynucleotide may be a single stranded sequence of nucleotides, such as RNA or single stranded DNA, a double stranded sequence of nucleotides, such as double stranded DNA, or may include a mixture of a single stranded and double stranded sequences of nucleotides. Double stranded DNA (dsDNA) includes genomic DNA, and PCR and amplification products. Single stranded DNA (ssDNA) can be converted to dsDNA and vice-versa. Polynucleotides may include non-naturally occurring DNA, such as enantiomeric DNA. The precise sequence of nucleotides in a polynucleotide may be known or unknown. The following are examples of polynucleotides: a gene or gene fragment (for example, a probe, primer, expressed sequence tag (EST) or serial analysis of gene expression (SAGE) tag), genomic DNA, genomic DNA fragment, exon, intron, messenger RNA (mRNA), transfer RNA, ribosomal RNA, ribozyme, cDNA, recombinant polynucleotide, synthetic polynucleotide, branched polynucleotide, plasmid, vector, isolated DNA of any sequence, isolated RNA of any sequence, nucleic acid probe, primer or amplified copy of any of the foregoing.

As used herein, a "polymerase" is intended to mean an enzyme having an active site that assembles polynucleotides by polymerizing nucleotides into polynucleotides. A polymerase can bind a primed single stranded target polynucleotide, and can sequentially add nucleotides to the growing primer to form a "complementary copy" polynucleotide having a sequence that is complementary to that of the target polynucleotide. Another polymerase, or the same polymerase, then can form a copy of the target nucleotide by forming a complementary copy of that complementary copy polynucleotide. Any of such copies may be referred to herein as "amplicons." DNA polymerases may bind to the target polynucleotide and then move down the target polynucleotide sequentially adding nucleotides to the free hydroxyl group at the 3' end of a growing polynucleotide strand (growing amplicon). DNA polymerases may synthesize complementary DNA molecules from DNA templates and RNA polymerases may synthesize RNA molecules from DNA templates (transcription). Polymerases may use a short RNA or DNA strand (primer), to begin strand growth. Some polymerases may displace the strand upstream of the site where they are adding bases to a chain. Such polymerases may be said to be strand displacing, meaning they have an activity that removes a complementary strand from a template strand being read by the polymerase. Example polymerases having strand displacing activity include, without limitation, the large fragment of Bst (*Bacillus stearothermophilus*) polymerase, exo-Klenow polymerase or sequencing grade T7 exo-polymerase. Some polymerases degrade the strand in front of them, effectively replacing it with the growing chain behind (5' exonuclease activity). Some polymerases have an activity that degrades the strand behind them (3' exonuclease activity). Some useful polymerases have been modified, either by mutation or otherwise, to reduce or eliminate 3' and/or 5' exonuclease activity.

As used herein, the term "primer" is defined as a polynucleotide to which nucleotides may be added via a free 3' OH group. A primer may include a 3' block preventing polymerization until the block is removed. A primer may include a modification at the 5' terminus to allow a coupling reaction or to couple the primer to another moiety. A primer may include one or more moieties which may be cleaved under suitable conditions, such as UV light, chemistry, enzyme, or the like. The primer length may be any suitable number of bases long and may include any suitable combination of natural and non-natural nucleotides. A target polynucleotide may include an "adapter" that hybridizes to (has a sequence that is complementary to) a primer, and may be amplified so as to generate a complementary copy polynucleotide by adding nucleotides to the free 3' OH group of the primer. A "capture primer" is intended to mean a primer that is coupled to the substrate and may hybridize to a second adapter of the target polynucleotide, while an "orthogonal capture primer" is intended to mean a primer that is coupled to the substrate and may hybridize to a first adapter of that target polynucleotide. The first adapter may have a sequence that is complementary to that of the orthogonal capture primer, and the second adapter may have a sequence that is complementary to that of the capture primer. A capture primer and an orthogonal capture primer may have different and independent sequences than one another. Additionally, a capture primer and an orthogonal capture primer may differ from one another in at least one other property. For example, the capture primer and the orthogonal capture primer may have different lengths than one another; either the capture primer or the orthogonal capture primer may include a non-nucleic acid moiety (such as a blocking group or excision moiety) that the other of the capture primer or the orthogonal capture primer lacks; or any suitable combination of such properties.

As used herein, the term "substrate" refers to a material used as a support for compositions described herein. Example substrate materials may include glass, silica, plastic, quartz, metal, metal oxide, organo-silicate (e.g., polyhedral organic silsesquioxanes (POSS)), polyacrylates, tantalum oxide, complementary metal oxide semiconductor (CMOS), or combinations thereof. An example of POSS can be that described in Kehagias et al., Microelectronic Engineering 86 (2009), pp. 776-778, which is incorporated by reference in its entirety. In some examples, substrates used in the present application include silica-based substrates, such as glass, fused silica, or other silica-containing material. In some examples, substrates may include silicon, silicon nitride, or silicone hydride. In some examples, substrates used in the present application include plastic materials or components such as polyethylene, polystyrene, poly (vinyl chloride), polypropylene, nylons, polyesters, polycarbonates, and poly(methyl methacrylate). Example plastics materials include poly(methyl methacrylate), polystyrene, and cyclic olefin polymer substrates. In some examples, the substrate is or includes a silica-based material or plastic material or a combination thereof. In particular examples, the substrate has at least one surface comprising glass or a silicon-based polymer. In some examples, the substrates may include a metal. In some such examples, the metal is gold. In some examples, the substrate has at least one surface comprising a metal oxide. In one example, the surface comprises a tantalum oxide or tin oxide. Acrylamides, enones, or acrylates may also be utilized as a substrate material or component. Other substrate materials may include, but are not limited to gallium arsenide, indium phosphide, aluminum, ceramics, polyimide, quartz, resins, polymers and copolymers. In some examples, the substrate and/or the substrate surface may be, or include, quartz. In some other examples, the substrate and/or the substrate surface may be, or include, semiconductor, such as GaAs or ITO. The foregoing lists are intended to be illustrative of, but not limiting to the present application. Substrates may comprise a single material or a plurality of different materials. Substrates may be composites or laminates. In some examples, the substrate comprises an organo-silicate material. Substrates may be flat, round, spherical, rod-shaped, or any other suitable shape. Substrates may be rigid or flexible. In some examples, a substrate is a bead or a flow cell.

In some examples, a substrate includes a patterned surface. A "patterned surface" refers to an arrangement of different regions in or on an exposed layer of a substrate. For example, one or more of the regions may be features where one or more capture primers are present. The features can be separated by interstitial regions where capture primers are not present. In some examples, the pattern may be an x-y format of features that are in rows and columns. In some examples, the pattern may be a repeating arrangement of features and/or interstitial regions. In some examples, the pattern may be a random arrangement of features and/or interstitial regions. In some examples, substrate includes an array of wells (depressions) in a surface. The wells may be provided by substantially vertical sidewalls. Wells may be fabricated as is generally known in the art using a variety of techniques, including, but not limited to, photolithography, stamping techniques, molding techniques and microetching techniques. As will be appreciated by those in the art, the technique used will depend on the composition and shape of the array substrate.

The features in a patterned surface of a substrate may include wells in an array of wells (e.g., microwells or nanowells) on glass, silicon, plastic or other suitable material(s) with patterned polymers such as provided herein. In one example, the polymer includes covalently-linked gel such as poly(N-(5-azidoacetamidylpentyl) acrylamide-co-acrylamide) (PAZAM). The patterning may provide polymer pads that may be used for sequencing, e.g., may be stable over sequencing runs with a large number of cycles. In some examples, covalent linking of the polymer to the wells may be helpful for maintaining the polymer in the structured features (e.g., wells) throughout the lifetime of the structured substrate during a variety of uses. However in some examples, the polymer need not be covalently linked to the wells.

In particular examples, a structured substrate may be made by patterning a substrate formed of suitable material with wells (e.g. microwells or nanowells), coating the substrate material with a polymer material, and polishing the surface of the polymer coated material, for example via chemical or mechanical polishing, thereby retaining polymer in the wells but removing or inactivating substantially all of the polymer from the interstitial regions on the surface of the structured substrate between the wells. Primers may be attached to polymer material, e.g., in a manner such as provided herein. A solution including a plurality of target polynucleotides (e.g., a fragmented human genome or portion thereof) may then be contacted with the polished substrate such that individual target polynucleotides will seed individual wells via interactions with primers attached to the polymer material; however, the target polynucleotides will not occupy the interstitial regions due to absence or inactivity there of the polymer material. Amplification of the target polynucleotides may be confined to the wells because absence or inactivity of polymer in the interstitial regions may inhibit outward migration of the growing cluster. The process is conveniently manufacturable, being scalable and utilizing conventional micro- or nano-fabrication methods.

A patterned substrate may include, for example, wells etched into a slide or chip. The pattern of the etchings and geometry of the wells may take on a variety of different shapes and sizes, and such features may be physically or functionally separable from each other. Particularly useful substrates having such structural features include patterned substrates that may select the size of solid particles such as microspheres. An example patterned substrate having these characteristics is the etched substrate used in connection with BEAD ARRAY technology (Illumina, Inc., San Diego, Calif.).

In some examples, a substrate described herein forms at least part of a flow cell or is located in or coupled to a flow cell. Flow cells may include a flow chamber that is divided into a plurality of lanes or a plurality of sectors. Example flow cells and substrates for manufacture of flow cells that may be used in methods and compositions set forth herein include, but are not limited to, those commercially available from Illumina, Inc. (San Diego, CA).

As used herein, the term "directly" when used in reference to a layer covering the surface of a substrate is intended to mean that the layer covers the substrate's surface without a significant intermediate layer, such as, e.g., an adhesive layer or a polymer layer. Layers directly covering a surface may be attached to this surface through any chemical or physical interaction, including covalent bonds or non-covalent adhesion.

As used herein, the term "immobilized" when used in reference to a polynucleotide is intended to mean direct or indirect attachment to a substrate via covalent or non-covalent bond(s). In certain examples, covalent attachment may be used, or any other suitable attachment in which the polynucleotides remain stationary or attached to a substrate under conditions in which it is intended to use the substrate, for example, in polynucleotide amplification or sequencing. Polynucleotides to be used as capture primers or as target polynucleotides may be immobilized such that a 3'-end is available for enzymatic extension and at least a portion of the sequence is capable of hybridizing to a complementary sequence. Immobilization may occur via hybridization to a surface attached oligonucleotide, in which case the immobilized oligonucleotide or polynucleotide may be in the 3'-5' orientation. Alternatively, immobilization may occur by means other than base-pairing hybridization, such as covalent attachment.

As used herein, the term “array” refers to a population of substrate regions that may be differentiated from each other according to relative location. Different molecules (such as polynucleotides) that are at different regions of an array may be differentiated from each other according to the locations of the regions in the array. An individual region of an array may include one or more molecules of a particular type. For example, a substrate region may include a single target polynucleotide having a particular sequence, or a substrate region may include several polynucleotides having the same sequence (or complementary sequences thereof). The regions of an array respectively may include different features than one another on the same substrate. Example features include without limitation, wells in a substrate, beads (or other particles) in or on a substrate, projections from a substrate, ridges on a substrate or channels in a substrate. The regions of an array respectively may include different regions on different substrates than each other. Different molecules attached to separate substrates may be identified according to the locations of the substrates on a surface to which the substrates are associated or according to the locations of the substrates in a liquid or gel. Example arrays in which separate substrates are located on a surface include, without limitation, those having beads in wells.

As used herein, the term “plurality” is intended to mean a population of two or more different members. Pluralities may range in size from small, medium, large, to very large. The size of small plurality may range, for example, from a few members to tens of members. Medium sized pluralities may range, for example, from tens of members to about 100 members or hundreds of members. Large pluralities may range, for example, from about hundreds of members to about 1000 members, to thousands of members and up to tens of thousands of members. Very large pluralities may range, for example, from tens of thousands of members to about hundreds of thousands, a million, millions, tens of millions and up to or greater than hundreds of millions of members. Therefore, a plurality may range in size from two to well over one hundred million members as well as all sizes, as measured by the number of members, in between and greater than the above example ranges. Example polynucleotide pluralities include, for example, populations of about $1\times10^5$ or more, $5\times10^5$ or more, or $1\times10^6$ or more different polynucleotides. Accordingly, the definition of the term is intended to include all integer values greater than two. An upper limit of a plurality may be set, for example, by the theoretical diversity of polynucleotide sequences in a sample.

As used herein, the term “double-stranded,” when used in reference to a polynucleotide, is intended to mean that all or substantially all of the nucleotides in the polynucleotide are hydrogen bonded to respective nucleotides in a complementary polynucleotide.

As used herein, the term “single-stranded,” when used in reference to a polynucleotide, means that essentially none of the nucleotides in the polynucleotide are hydrogen bonded to a respective nucleotide in a complementary polynucleotide.

As used herein, the term “target polynucleotide” is intended to mean a polynucleotide that is the object of an analysis or action. The analysis or action includes subjecting the polynucleotide to amplification, sequencing and/or other procedure. A target polynucleotide may include nucleotide sequences additional to a target sequence to be analyzed. For example, a target polynucleotide may include one or more adapters, including an adapter that functions as a primer binding site, that flank(s) a target polynucleotide sequence that is to be analyzed. A target polynucleotide hybridized to a capture primer may include nucleotides that extend beyond the 5' or 3' end of the capture oligonucleotide in such a way that not all of the target polynucleotide is amenable to extension. In particular examples, target polynucleotides may have different sequences than one another but may have first and second adapters that are the same as one another. The two adapters that may flank a particular target polynucleotide sequence may have the same sequence as one another, or complementary sequences to one another, or the two adapters may have different sequences. Thus, species in a plurality of target polynucleotides may include regions of known sequence that flank regions of unknown sequence that are to be evaluated by, for example, sequencing (e.g., SBS). In some examples, target polynucleotides carry an adapter at a single end, and such adapter may be located at either the 3' end or the 5' end the target polynucleotide. Target polynucleotides may be used without any adapter, in which case a primer binding sequence may come directly from a sequence found in the target polynucleotide.

The terms “polynucleotide” and “oligonucleotide” are used interchangeably herein. The different terms are not intended to denote any particular difference in size, sequence, or other property unless specifically indicated otherwise. For clarity of description the terms may be used to distinguish one species of polynucleotide from another when describing a particular method or composition that includes several polynucleotide species.

As used herein, the term “amplicon,” when used in reference to a polynucleotide, is intended to means a product of copying the polynucleotide, wherein the product has a nucleotide sequence that is substantially the same as, or is substantially complementary to, at least a portion of the nucleotide sequence of the polynucleotide. “Amplification” and “amplifying” refer to the process of making an amplicon of a polynucleotide. A first amplicon of a target polynucleotide may be a complementary copy. Additional amplicons are copies that are created, after generation of the first amplicon, from the target polynucleotide or from the first amplicon. A subsequent amplicon may have a sequence that is substantially complementary to the target polynucleotide or is substantially identical to the target polynucleotide. It will be understood that a small number of mutations (e.g., due to amplification artifacts) of a polynucleotide may occur when generating an amplicon of that polynucleotide.

As used herein, the term “inactive moiety” is intended to mean a first chemical entity that is substantially unreactive with a second chemical entity under a specified set of conditions. As used herein, the term “active moiety” is intended to mean a third chemical entity that is reactive with the second chemical entity under the specified set of conditions. The first chemical entity may be converted to the third chemical entity, thus converting an inactive moiety to an active moiety.

As used herein, to "selectively irradiate" a portion of an element with light is intended to mean that substantially only that portion of the element is irradiated with the light, while other portions(s) of that element are not irradiated with the light. A non-limiting example of a way to selectively irradiate a portion of an element with light is to mask other portions of that element from being irradiated, and then irradiate the entire element or any suitable portion thereof that includes the portion being selectively irradiated. Another non-limiting example of a way to selectively irradiate a portion of an element with light is to use a light-focusing optic, optionally in combination with one or more other elements such as a light coupling grating in a manner such as described in PCT Publication No. WO 2021/028815 and entitled "System and Method for Patterning Flow Cell Substrates," the entire contents of which are incorporated by reference herein.

As used herein, the term "mask" is intended to mean an optical component that inhibits the transmission of light to an entity, while the term "unmask" is intended to mean removing such an optical component so as to permit the transmission of light to that entity.

Methods of Coupling Oligonucleotides to Polymers

Some examples provided herein relate to providing capture primers with selected characteristics in region(s) of a polymer in which clusters are to be generated. The examples herein are particularly well suited to generating clusters for use in simultaneous paired-end reads in which an amplified polynucleotide's sequence is read using SBS in a first region of a polymer, and that polynucleotide's complementary sequence is read using SBS in a second region of a polymer, in parallel with one another, but it should be understood that the examples are generally applicable to any type of cluster, and indeed to any polymer to which it may be desired to couple any type of oligonucleotide.

Figure 3A:
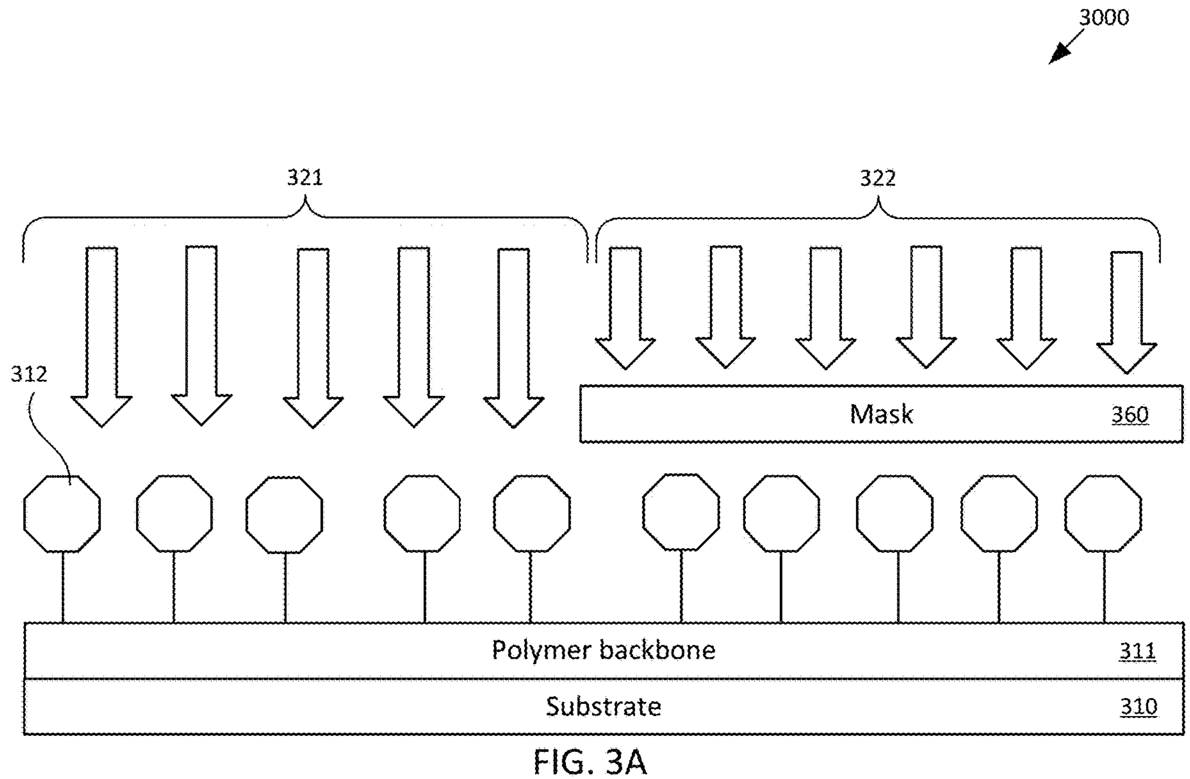
FIGS. 3A-3H schematically illustrate example compositions and operations in a process flow for coupling different oligonucleotides to first and second regions of a polymer disposed on a substrate.
Figure 3B:
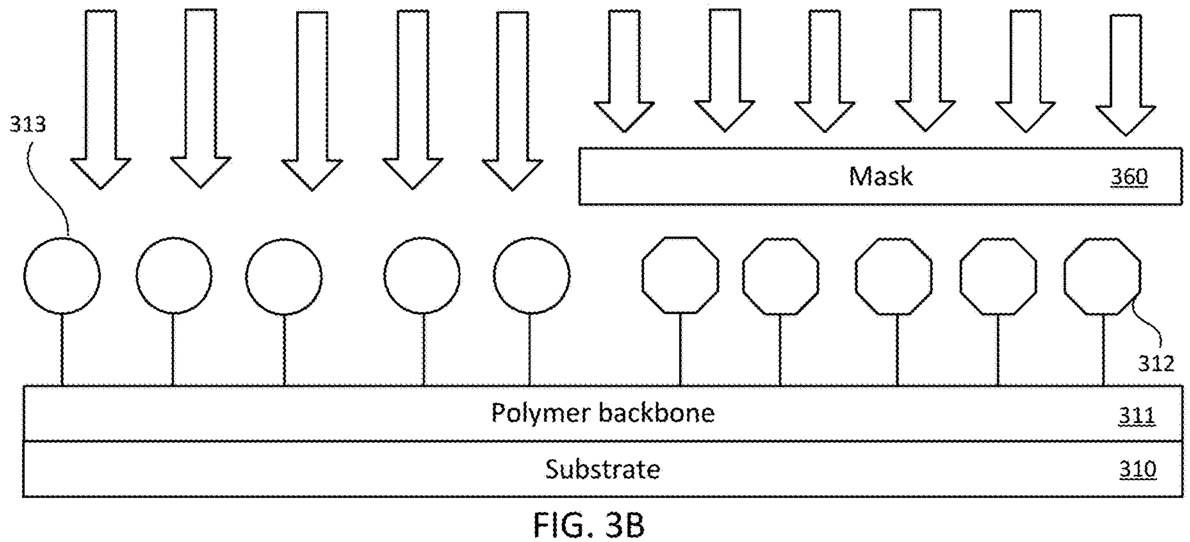

For example, FIGS. 3A-3H schematically illustrate example compositions and operations in a process flow for coupling different oligonucleotides to first and second regions of a polymer disposed on a substrate. Composition 3000 illustrated in FIG. 3A includes substrate 310 and a polymer including backbone 311 disposed on (e.g., immobilized on) substrate 310, and inactive moieties 312 coupled to backbone 311. In a manner such as illustrated in FIG. 3A, inactive moieties 312 in first region 321 of the polymer may be selectively irradiated with light (as indicated by the downward-pointing arrows), while inactive moieties 312 in second region 322 of the polymer are not irradiated. For example, second region 322 may be masked using mask 360 (as indicated by the mask blocking the downward-pointing arrows). In a manner such as illustrated in FIG. 3B, the light may generate first active moieties 313 in the first region of the polymer, e.g., may convert inactive moieties 312 in the first region of the polymer to active moieties. In this regard, the light may have a wavelength and an intensity suitable for performing such conversion, e.g., may be in the range of about 365 nm to about 450 nm so as to have sufficiently high frequency to perform the conversion while substantially not damaging the oligonucleotides. Nonlimiting examples of polymer backbones coupled to inactive moieties that may be converted to active moieties, using light, are provided elsewhere herein. Optionally, before selectively irradiating region 321 with light, a photoresist may be deposited over such regions and may increase the accuracy with which region 321 is irradiated while maintaining region 322 as not irradiated. The photoresist then may be removed, e.g., using a suitable solvent, before contacting the polymer with fluid 320 in a manner such as described with reference to FIG. 3C. In some examples, the irradiated photoresist is removed from first region 321 and the non-irradiated photoresist is removed from second region 322 in different steps than one another, or in a common step as one another.

Figure 3C:
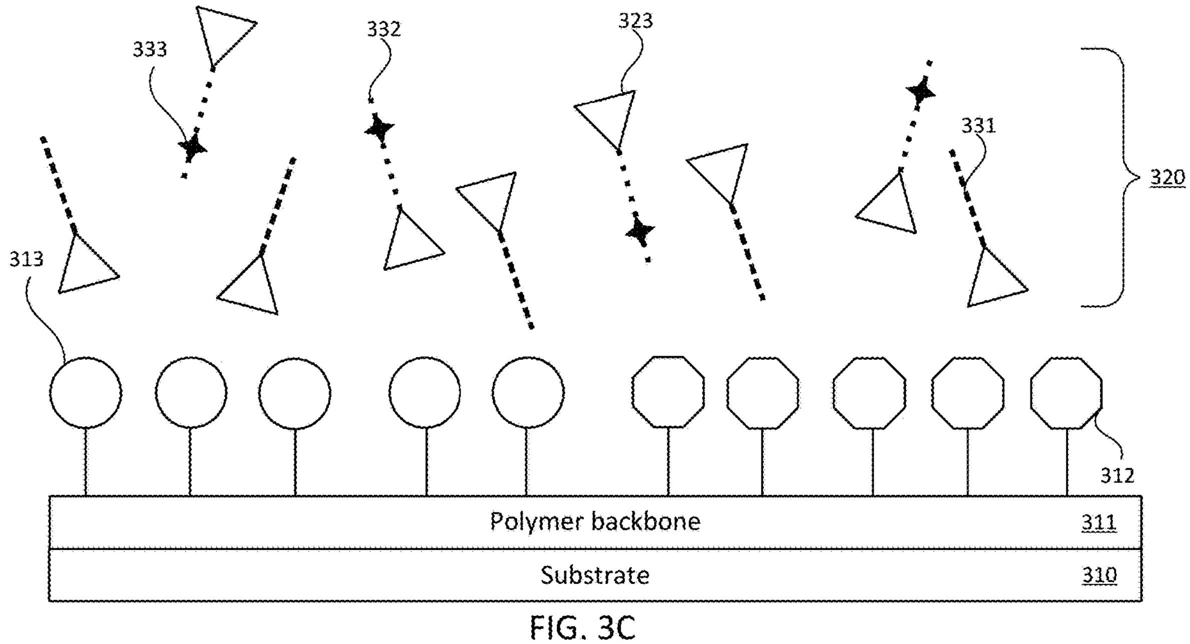
Figure 3D:
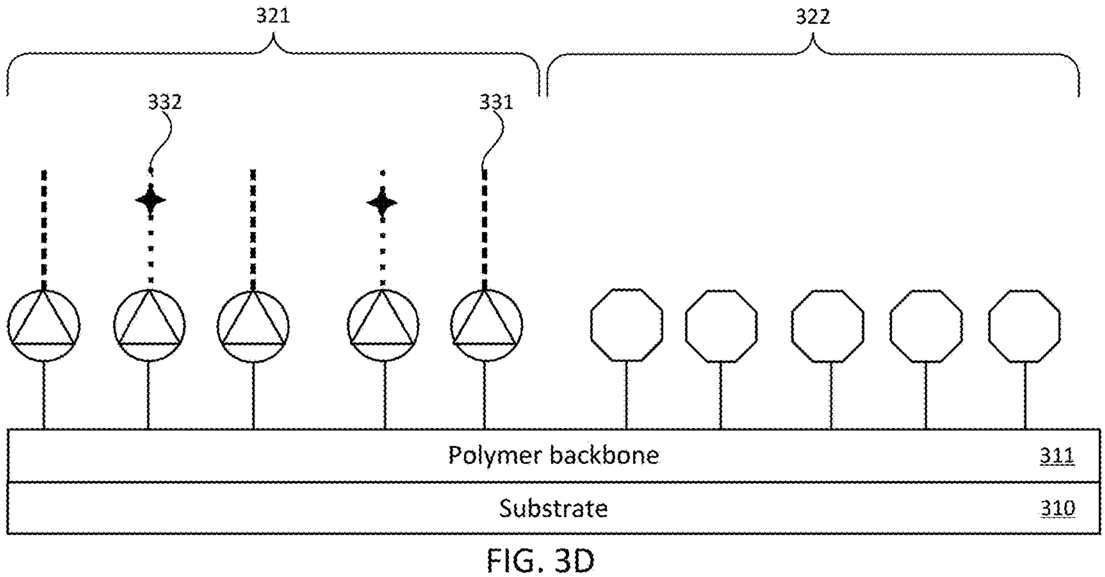

The first active moieties 313 then may be coupled to first oligonucleotides. For example, in a manner such as illustrated in FIG. 3C, first active moieties 313 and inactive moieties 312 may be contacted with fluid 320. In the illustrated example, fluid 320 includes a mixture of oligonucleotides 331 corresponding to oligonucleotides 231 described with reference to FIG. 2A, and oligonucleotides 332 corresponding to oligonucleotides 232 described with reference to FIG. 2A. Oligonucleotides 332 may include excision moieties 333, while oligonucleotides 331 may lack excision moieties. Each oligonucleotide 331, 332 may include reactive group 323 with which first active moieties 313 may react, and with which inactive moieties 312 substantially may not react. As such, in a manner such as illustrated in FIG. 3D, a mixture of oligonucleotides 331, 332 may become coupled to the polymer within region 321, while oligonucleotides may not become coupled to the polymer within region 322. Nonlimiting examples of reactive groups that may be used to react with active moieties, and that substantially do not react with inactive moieties, are provided elsewhere herein.

Although it may be expected that substantially all of the first active groups 313 within region 321 fully react with reactive groups 323 and thus become unavailable for any subsequent reactions, an additional "capping" reaction optionally may be performed in which any remaining first active groups 313 are contacted with an additional reagent with which such first active groups react and as such become unavailable for any subsequent reactions. Illustratively, a "capping" reaction may include the addition of monofunctional azide molecules, such as polyethylene glycol-azide (PEG-azide), 1-azidohexane, 3-azidopropanoic acid, 3-azidopropan-1-ol, or the like, or the addition of active groups which react with olefins, such as 1-hexen-6-ol or 5-hexenoic acid.

Figure 3E:
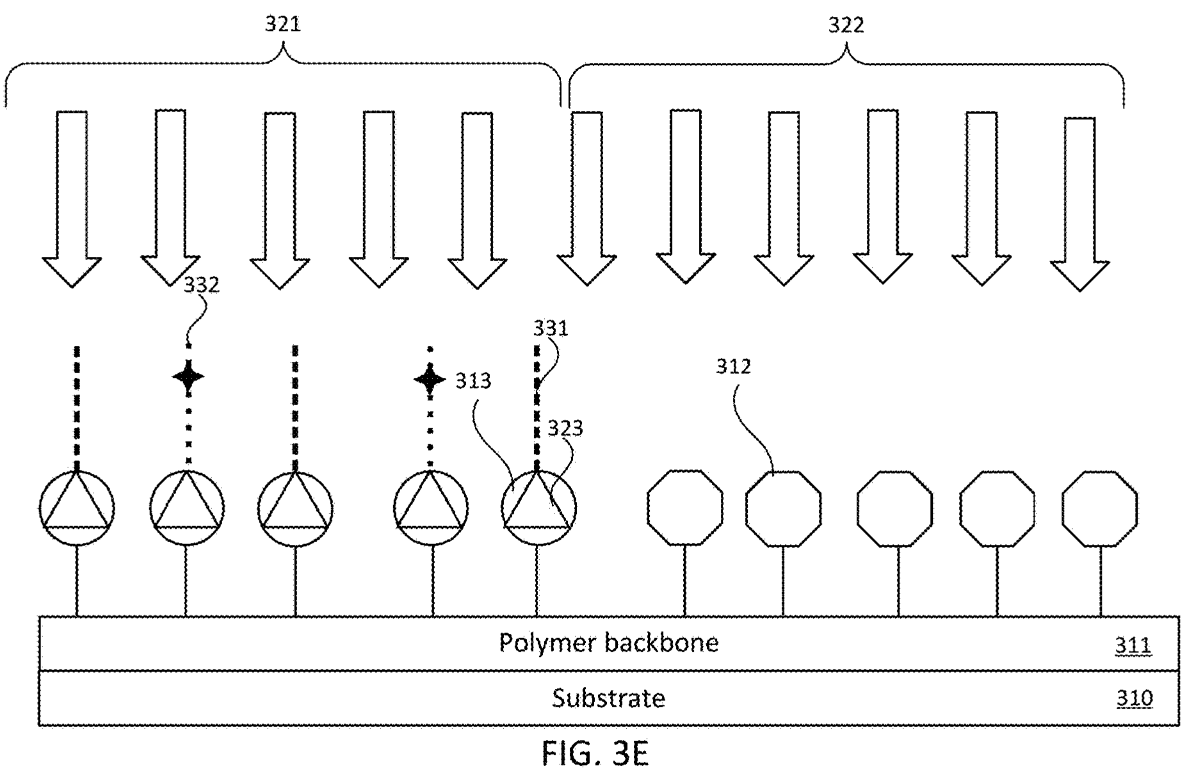
Figure 3F:
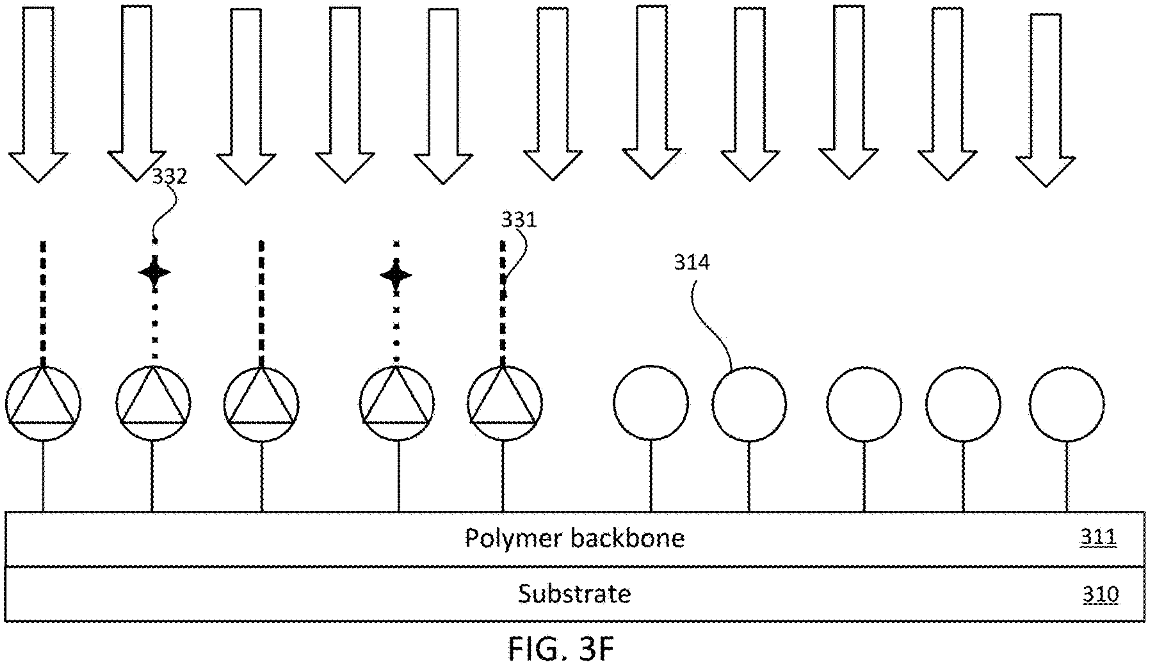

Second region 322 of the polymer then may be irradiated. For example, in a manner such as illustrated in FIG. 3E, second region 322 of the polymer may be unmasked, and inactive moieties 312 in the second region of the polymer may be irradiated with light to generate second active moieties 314 in the second region of the polymer, such as illustrated in FIG. 3F. The second active moieties 314 may be chemically identical to first active moieties 313, but in a different region 322 of the polymer. In some examples, region 321 may be irradiated with light at the same time as region 322, for example because any inactive moieties 312 in region 321 already would have been converted to active moieties 313 and substantially completely reacted with reactive group 323 or an optional capping reagent. However, it will be appreciated that region 322 may be selectively irradiated, e.g., region 321 optionally may be masked while region 322 is irradiated with light, for example to inhibit the light from degrading oligonucleotides 331, 332. Additionally, or alternatively, the wavelength of the light may be selected so as to inhibit light-induced degradation of the oligonucleotides, e.g., may be in the range of about 365 nm to about 450 nm.

Figure 3G:
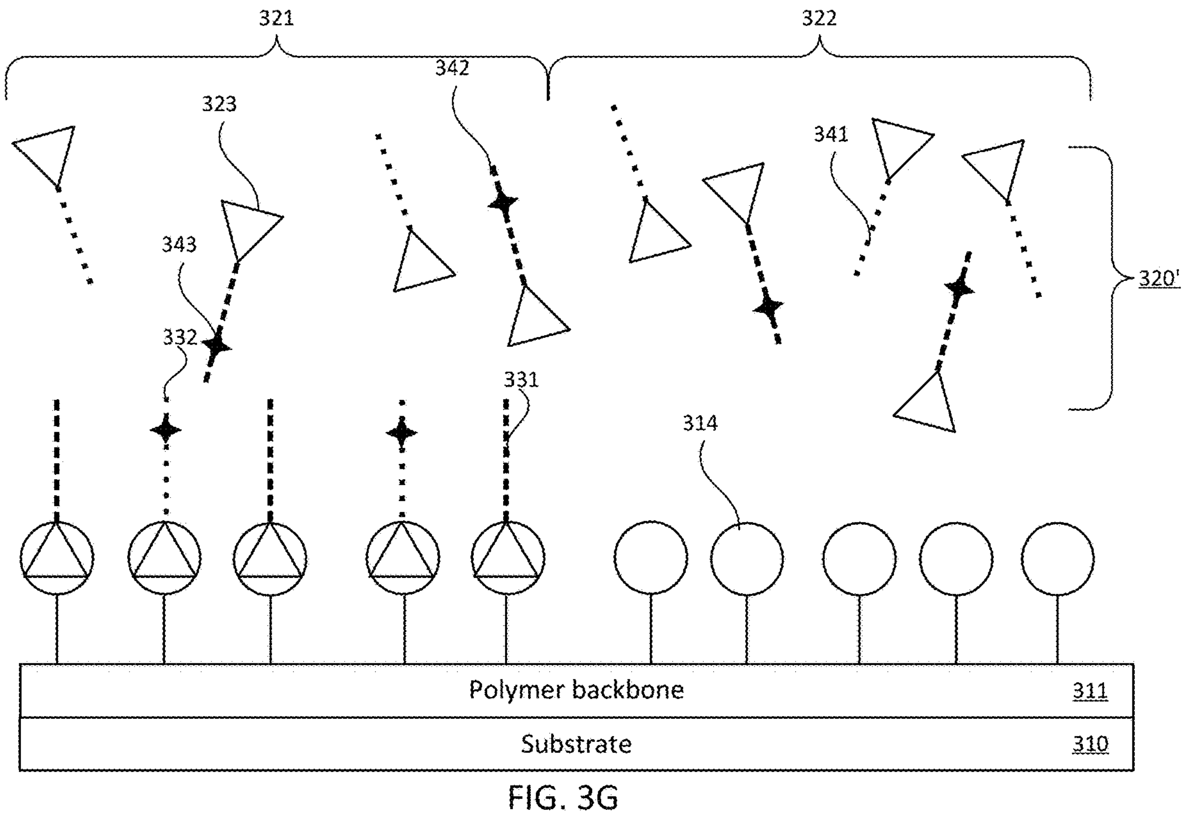
Figure 3H:
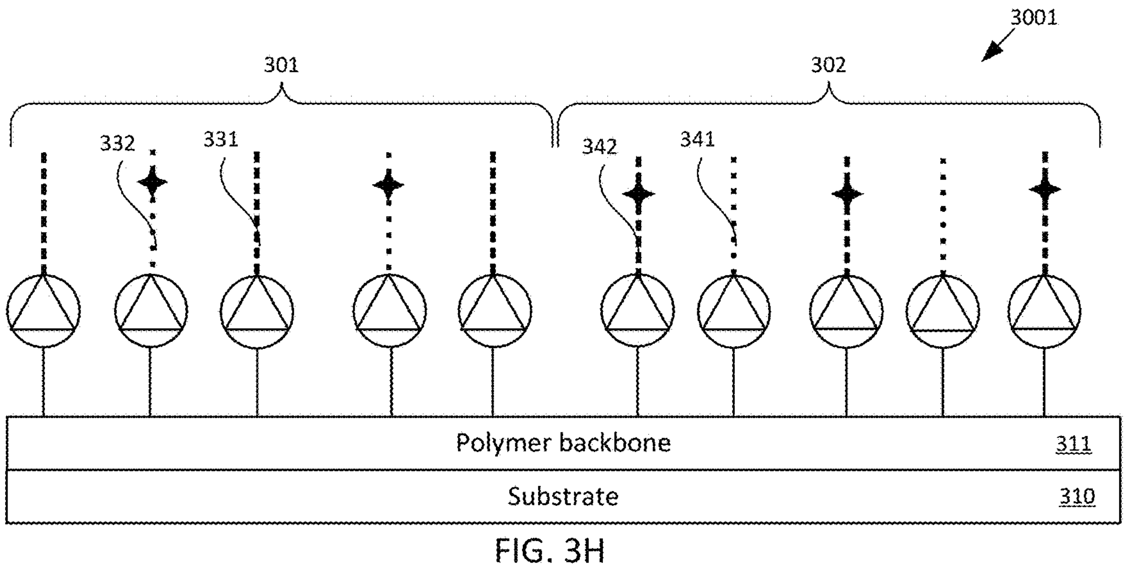

The second active moieties 314 then may be coupled to second oligonucleotides. For example, in a manner such as illustrated in FIG. 3G, second active moieties 314, as well as oligonucleotides 331, 332, may be contacted with fluid 320'. In the illustrated example, fluid 320' includes a mixture of oligonucleotides 341 corresponding to oligonucleotides 241 described with reference to FIG. 2A, and oligonucleotides 342 corresponding to oligonucleotides 242 described with reference to FIG. 2A. Oligonucleotides 342 may include excision moieties 343, while oligonucleotides 341 may lack excision moieties, as shown in FIG. 3G. Each oligonucleotide 341, 342 may include reactive group 323 with which second active moieties 314 may react, and which may be the same type of reactive group as used during the operation illustrated in FIG. 3C. As such, in a manner such as illustrated in FIG. 3H, a mixture of oligonucleotides 341, 342 may become coupled to the polymer within region 322 (shown in FIG. 3G), while oligonucleotides 331, 332 may remain coupled to the polymer within region 321 (shown in FIG. 3G). The resulting composition 3001 illustrated in FIG. 3H may include polymer region 301 corresponding to polymer region 101 described with reference to FIG. 1 and polymer region 201 described with reference to FIG. 2A, and polymer region 302 corresponding to polymer region 102 described with reference to FIG. 1 and polymer region 202 described with reference to FIG. 2A, and may be used to amplify a target polynucleotide in a similar manner as described with reference to FIGS. 1 and 2A-2D.

Any suitable inactive moieties 312 may be used that may be converted to active moieties 313 in a manner such as described with reference to FIGS. 3A-3B and to active moieties 314 in a manner such as described with reference to FIGS. 3E-3F. Illustratively, inactive moieties 312 may include cyclopropenone-masked dibenzocyclooctyne having the structure:

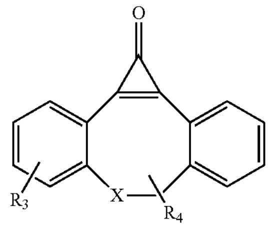

wherein one of $R_3$ and $R_4$ is $R_1$ and the other is H; wherein $R_1$ is a linkage to a backbone of the polymer; and wherein X is $CH_2$, O, S, or NH if $R_4$ is not directly coupled to X, or wherein X is CH or N if $R_4$ is directly coupled to X. Irradiation with ultraviolet (UV) light, (e.g., at 350 nm and a suitable intensity) causes decarbonylation of the cyclopropenone-masked dibenzocyclooctyne to form the active moiety, a dibenzocyclooctyne (DBCO):

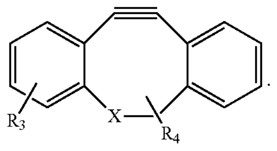

In a manner such as described above with reference to FIG. 3C, the reactive groups 323 to which oligonucleotides 331, 332 in fluid 320 are coupled may be azides ($N_3$), and in a manner such as described with reference to FIG. 3G, the reactive groups 323 to which oligonucleotides 341, 342 in fluid 320' are coupled also may be azides. The azides may react with the dibenzocyclooctyne to form a cycloadduct having the structure:

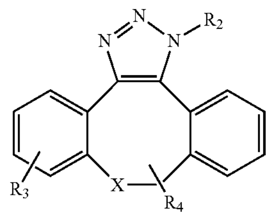

where $R_2$ represents the oligonucleotide, thus coupling the oligonucleotide to the polymer.

In one nonlimiting example, the cyclopropenone-masked dibenzocyclooctyne has the structure:

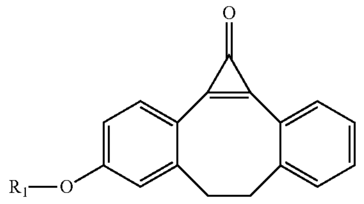

where $R_1$ represents a linkage to backbone 311 of the polymer. Irradiation with ultraviolet (UV) light, (e.g., at 350 nm and a suitable intensity) causes decarbonylation of the cyclopropenone-masked dibenzocyclooctyne to form the active moiety dibenzocyclooctyne (DBCO):

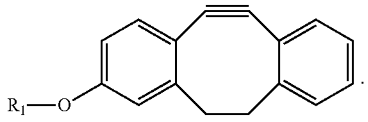

In a manner such as described above with reference to FIG. 3C, the reactive groups 323 to which oligonucleotides 331, 332 in fluid 320 are coupled may be azides ($N_3$), and in a manner such as described with reference to FIG. 3G, the reactive groups 323 to which oligonucleotides 341, 342 in fluid 320' are coupled also may be azides. The azides may react with the dibenzocyclooctyne to form a cycloadduct having the structure:

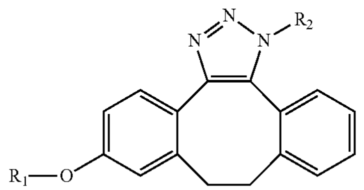

where $R_2$ represents the oligonucleotide, thus coupling the oligonucleotide to the polymer.

In other examples, inactive moieties 312 may include a tetrazole having the structure:

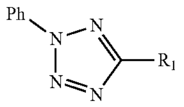

where $R_1$ represents a linkage to backbone 311 of the polymer. Irradiation with ultraviolet (UV) light, (e.g., at 300-365 nm and a suitable intensity) causes denitrogenation (loss of $N_2$) of the inactive moiety to form the active moiety, a nitrile imine having the structure:

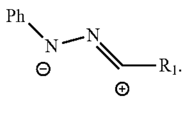

In a manner such as described above with reference to FIG. 3C, the reactive groups 323 to which

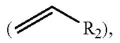

oligonucleotides 331, 332 in fluid 320 are coupled may include olefins ($R_2$), and in a manner such as described with reference to FIG. 3G, the reactive groups 323 to which

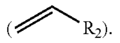

oligonucleotides 341, 342 in fluid 320' are coupled also may be olefins ($R_2$). The olefins may react with the active moiety to form a pyrazoline having the structure:

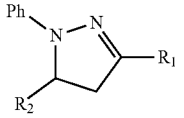

where $R_2$ represents the oligonucleotide, thus coupling the oligonucleotide to the polymer.

In still other examples, inactive moieties 312 may include a 3-(hydroxymethyl)-2-naphthol having the structure:

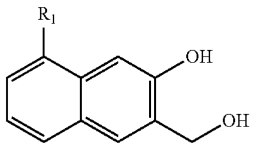

where $R_1$ represents a linkage to backbone 311 of the polymer. Irradiation with ultraviolet (UV) light, (e.g., at 300-350 nm and a suitable intensity) causes condensation of $H_2O$ from the inactive moiety to form the active moiety having the structure:

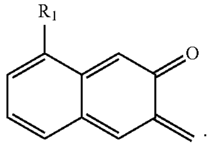

In a manner such as described above with reference to FIG. 3C, the reactive groups 323 to which oligonucleotides 331, 332 in fluid 320 are coupled may be vinyl ethers

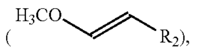

and in a manner such as described with reference to FIG. 3G, the reactive groups 323 to which oligonucleotides 341, 342 in fluid 320' are coupled also may be vinyl ethers

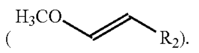

The vinyl ethers may react with the active moiety to form a benzochroman having the structure:

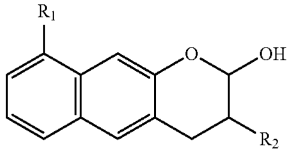

where $R_2$ represents the oligonucleotide, thus coupling the oligonucleotide to the polymer.

In yet other examples, inactive moieties 312 may include a 2H-azirine having the structure:

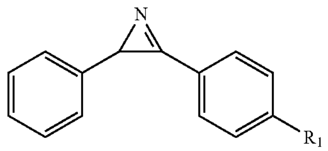

where $R_1$ represents a linkage to a backbone of the polymer. Irradiation with ultraviolet (UV) light, (e.g., at about 302 nm and a suitable intensity) causes a ring-opening rearrangement of the 2H-azirine inactive moiety to form the active moiety, a nitrile ylide having the structure:

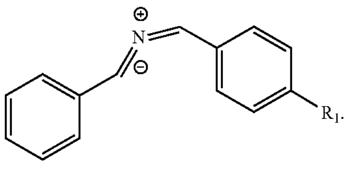

In a manner such as described above with reference to FIG. 3C, the reactive groups 323 to which oligonucleotides 331, 332 in fluid 320 are coupled may be olefins

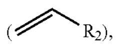

and in a manner such as described with reference to FIG. 3G, the reactive groups 323 to which oligonucleotides 341, 342 in fluid 320' are coupled also may be olefins

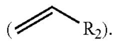

The olefins may react with the active moiety to form a pyrroline having the structure:

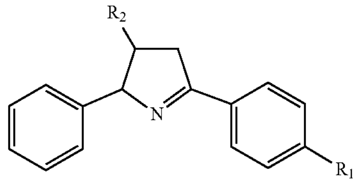

where $R_2$ represents the oligonucleotide, thus coupling the oligonucleotide to the polymer.

Nonlimiting examples of polymers that may include inactive moieties that may be converted to active moieties such as exemplified above using light, and methods of making such polymers, are provided in greater detail elsewhere herein.

Although the examples described with reference to FIGS. 3A-3H may suggest the use of a flat substrate with first and second regions that are adjacent to one another, it should be apparent that more complex substrates may be used. For example, FIGS. 4A-4E schematically illustrate example compositions and operations in a process flow for coupling different oligonucleotides to an array of first and second regions of a polymer disposed on a substrate. Compositions such as described with reference to FIGS. 4A-4E may be prepared and used in a manner similar to those described with reference to FIGS. 3A-3H.

Figure 4A:
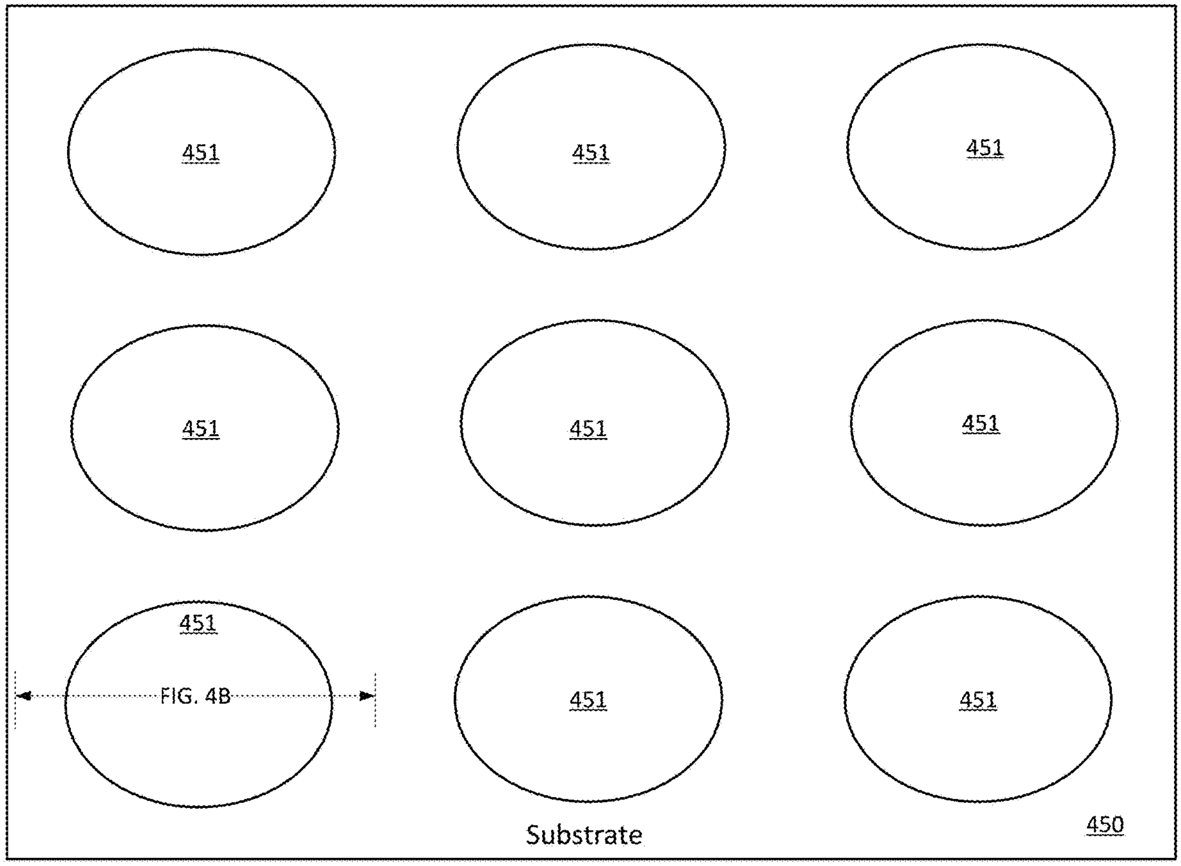
FIGS. 4A-4E schematically illustrate example compositions and operations in a process flow for coupling different oligonucleotides to an array of first and second regions of a polymer disposed on a substrate.
Figure 4B:
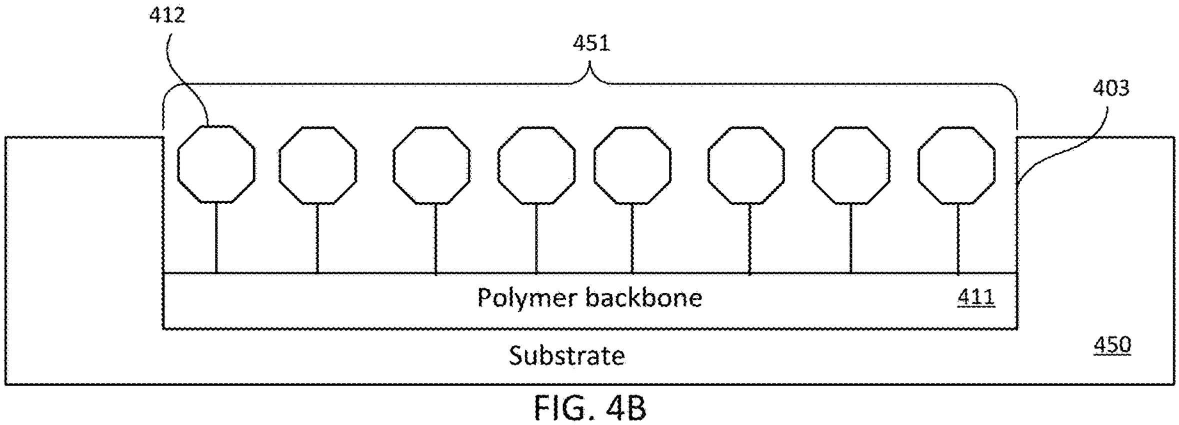
Figure 4C:
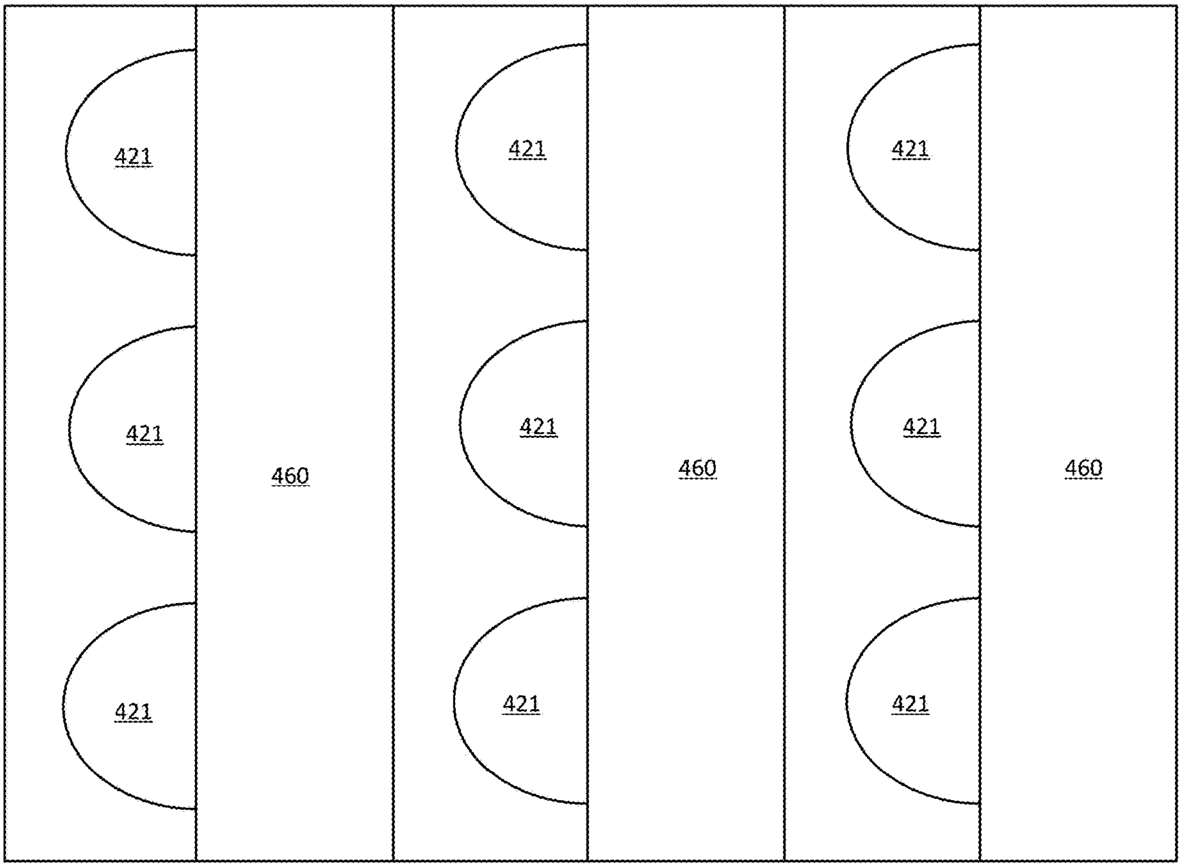
Figure 4D:
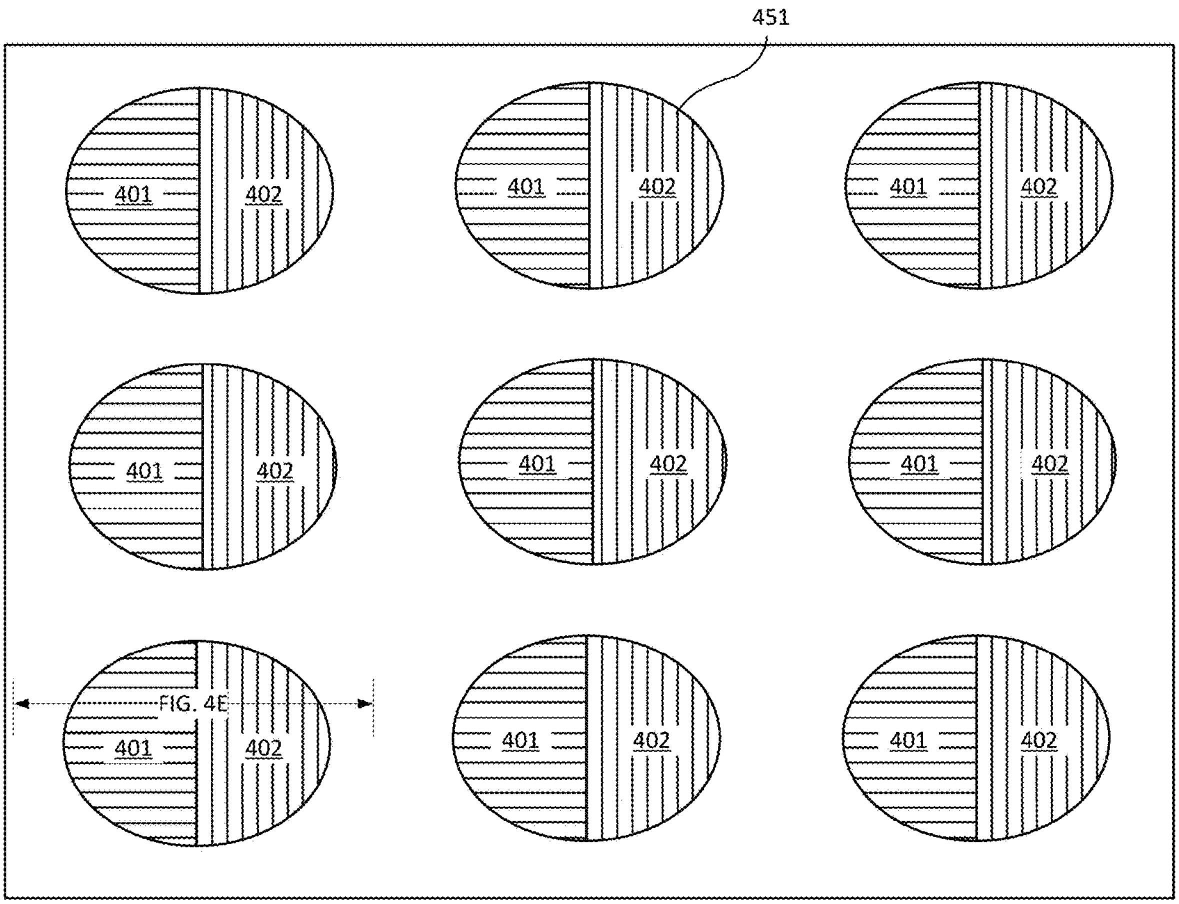
Figure 4E:
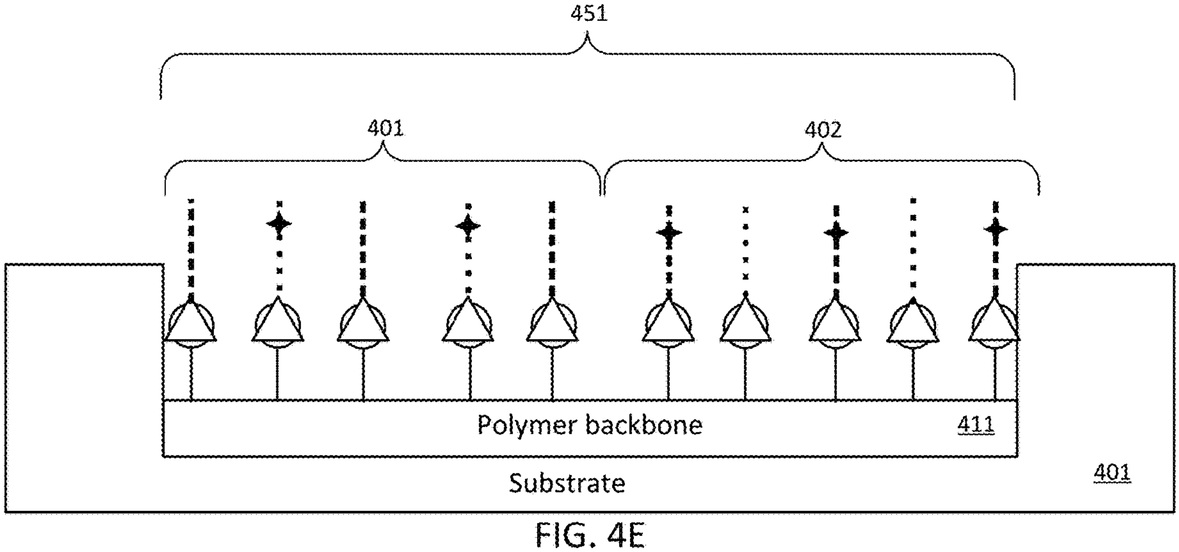

In the example shown in plan view in FIG. 4A, a portion of which is shown in cross sectional view in FIG. 4B, substrate 450 may include a plurality of vertical sidewalls 403 providing an array of wells 451 within each of which a polymer may be disposed, e.g., including backbone 411 and inactive moieties 412 such as described with reference to FIGS. 3A-3H and as exemplified elsewhere herein. The polymer within the array of wells 451 may be masked, or otherwise selectively irradiated, in any suitable manner so as to irradiate only a portion of the polymer within each well. For example, a plurality of parallel, elongated masks 460 may extend across and thus mask regions of multiple wells 451, while leaving regions 421 exposed for irradiation in a manner such as illustrated in FIG. 4C. Processes such as described with reference to FIGS. 3A-3H then may be performed so as to obtain an array of wells 451 such as illustrated in plan view in FIG. 4D, a portion of which is shown in cross sectional view in FIG. 4E. Within each of wells 451 may be disposed a first polymer region 401 which may be configured similarly as polymer regions 101, 201, and 301 respectively described with reference to FIGS. 1, 2A-2D, and 3H, and polymer region 402 which may be configured and used similarly as polymer regions 102, 202, and 302 respectively described with reference to FIGS. 1, 2A-2D, and 3H. Accordingly, a first region of the polymer may be considered to include a plurality of first subregions 401, and a second region of the polymer may be considered to include a plurality of second subregions 402. In a manner such as illustrated in FIG. 4D, each of the first subregions 401 may be contiguous with a corresponding one of the second subregions 402. Additionally, in a manner such as illustrated in FIG. 4D, each of the first subregions 401, and the corresponding one of the second subregions 402 with which that first subregion is continuous, is located within a well 451, as illustrated in FIG. 4E.

Figure 5:
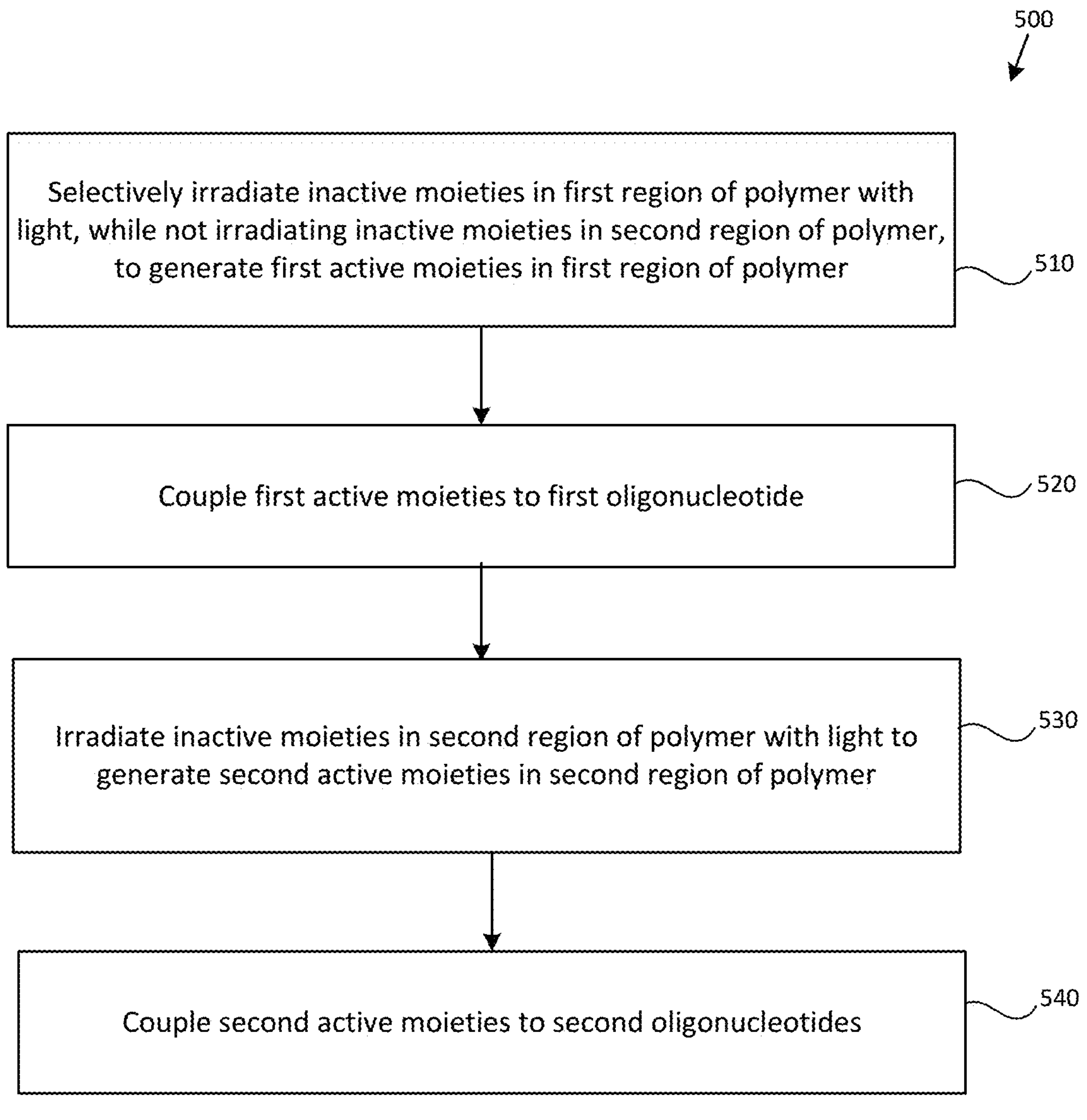
FIG. 5 illustrates an example flow of operations in a method for coupling different oligonucleotides to first and second regions of a polymer.

FIG. 5 illustrates an example flow of operations in a method for coupling different oligonucleotides to first and second regions of a polymer. Method 500 illustrated in FIG. 5 may include selectively irradiating inactive moieties in a first region of a polymer with light, while not irradiating inactive moieties in a second region of the polymer, to generate first active moieties in the first region of the polymer (operation 510). Nonlimiting examples of such selective irradiation are described with reference to FIGS. 3A-3B and 4C. Method 500 illustrated in FIG. 5 also may include coupling the first active moieties to first oligonucleotides (operation 520). Nonlimiting examples of such coupling are described with reference to FIGS. 3C-3D. Method 500 illustrated in FIG. 5 also may include irradiating the inactive moieties in the second region of the polymer with light to generate second active moieties in the second region of the polymer (operation 530). Nonlimiting examples of such irradiating are described with reference to FIGS. 3E-3F. Method 500 illustrated in FIG. 5 also may include coupling the second active moieties to second oligonucleotides (operation 540). Nonlimiting examples of such coupling are described with reference to FIGS. 3G-3H.

Polymers, and Methods of Making Polymers

Nonlimiting examples of inactive moieties that may be converted to active moieties using light, and reactive groups that may be reacted with such active moieties to couple oligonucleotides to polymers, are provided above with reference to FIGS. 3A-3H. Some nonlimiting examples of methods of forming polymers including such inactive moieties, and the resulting polymers, now will be described.

In some examples, a polymer includes a poly(cyclopropenone masked dibenzocyclooctyne-acrylamide-co-acrylamide) copolymer having the structure:

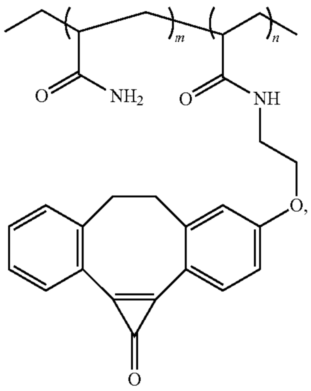

where, in some examples, m is in the range of about 50 to 100,000 and n is in the range of about 5 to 20,000. Note that the cyclopropenone-masked dibenzocyclooctyne may have any suitable structure such as described further above to form any suitable copolymer of cyclopropenone-masked dibenzocyclooctyne functional monomers, and is not limited to this particular example. Such a polymer may be made in a method including the radical-induced copolymerization reaction:

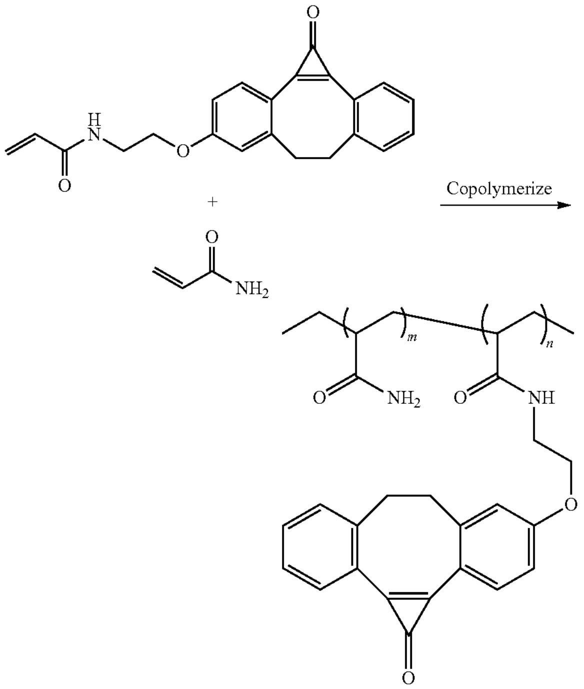

which may be performed as random, blocky, diblock, multiblock, gradient, or other suitable type of copolymerization.

In a manner such as described with reference to FIGS. 3A-3H, the cyclopropenone-masked dibenzocyclooctyne of such polymer corresponds to inactive moiety 312, and may be converted to an active moiety using light. The polymer resulting from such conversion may include a poly(dibenzocyclooctyne-acrylamide-co-acrylamide) copolymer having the structure:

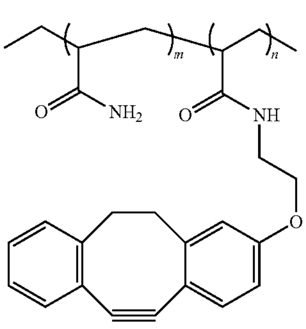

Note that the dibenzocyclooctyne may have any suitable structure such as described further above. Such polymer may be made in a method including the light-induced reaction:

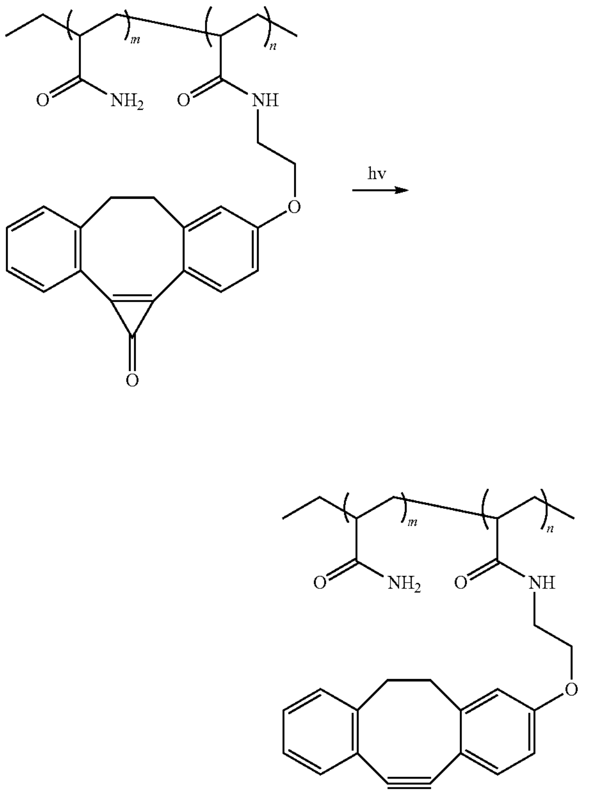

Such a polymer may be disposed on a substrate, and may be covalently or non-covalently coupled to the substrate. So as to facilitate covalent coupling to a substrate, the above-described polymer (in which the cyclopropenone-masked dibenzocyclooctyne may have any suitable structure) may be modified so as to be an azide functional polymer having the structure:

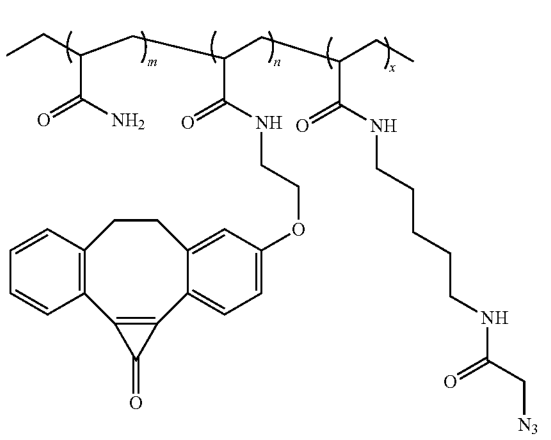

in which, in some examples, m and n may be as defined above, and x is number of repeat units of azide-functionalized acrylamide, e.g., in the range of about 5 to 10,000. Such an azide functional polymer may be formed using a method including the radical-induced polymerization reaction:

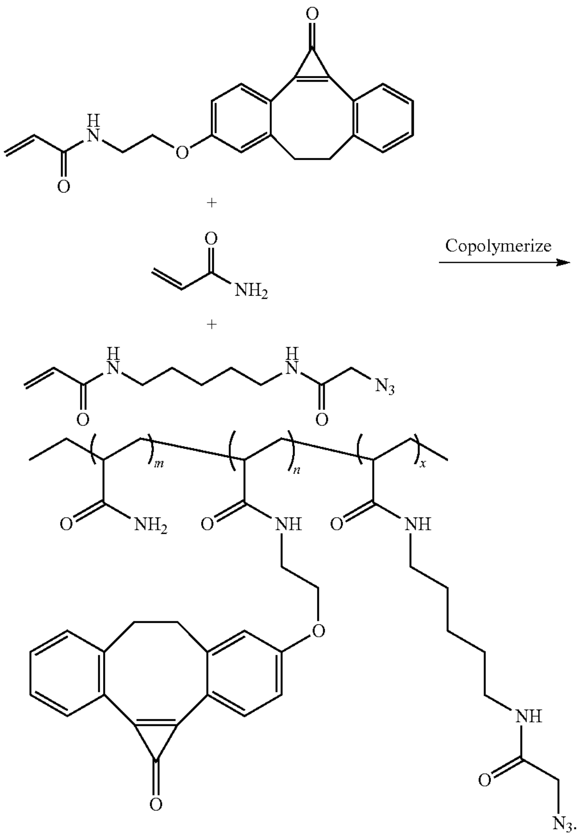

which may be performed as random, blocky, diblock, multiblock, gradient, or other suitable type of copolymerization.

The azide may be reacted with a substrate to covalently couple the polymer to the substrate. For example, the polymer may be deposited onto a substrate that includes norbornene groups:

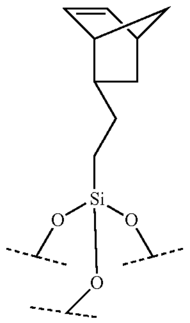

where the dotted lines represent the surface of the substrate. The norbornene groups may be functionalized (e.g., may be substituted or may include hetero(norbornenes)), and may be coupled to the substrate, in a manner such as described in U.S. Pat. No. 9,994,687, the entire contents of which are incorporated by reference herein. The azide ($N_3$) groups of the polymer may be reacted with the norbornene groups to couple the polymer to the substrate, for example using a 1,3-dipolar cycloaddition such as described in U.S. Pat. No. 9,994,687. The cyclopropenone-masked dibenzocyclooctyne of such polymer then may be converted to the active moiety DBCO, and reacted with azide-coupled oligonucleotides to couple the oligonucleotides to the polymer, and to the substrate, in a manner such as described elsewhere herein.

In some examples, an azide functionalized polymer includes an acrylamide-azidoacrylamide-(3-(hydroxymethyl)-2-naphthol)acrylamide copolymer having the structure:

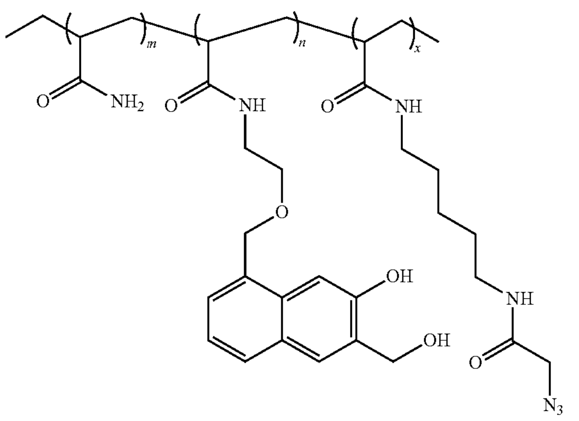

where m is 50 to 100,000, n is 5 to 10,000, and x is 5 to 10,000.

Such a polymer may be made in a method including the radical-induced copolymerization reaction:

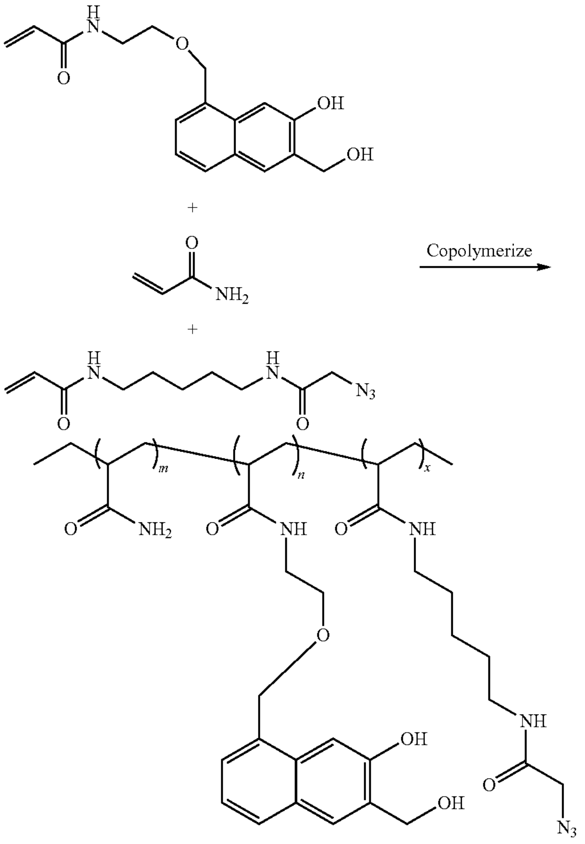

which may be performed as random, blocky, diblock, multiblock, gradient, or other suitable type of copolymerization. The azide may be reacted with a substrate to covalently couple the polymer to the substrate. For example, the polymer may be deposited onto a substrate that includes norbornene groups. The azide ($N_3$) groups of the polymer may be reacted with the norbornene groups to couple the polymer to the substrate, for example using a 1,3-dipolar cycloaddition such as described in U.S. Pat. No. 9,994,687. The 3-(hydroxymethyl)-2-naphthol of such polymer then may be converted to the active moiety, and reacted with azide-coupled oligonucleotides to couple the oligonucleotides to the polymer, and to the substrate, in a manner such as described elsewhere herein.

In some examples, an azide functionalized polymer includes an acrylamide-azidoacrylamide-tetrazoleacrylamide copolymer having the structure:

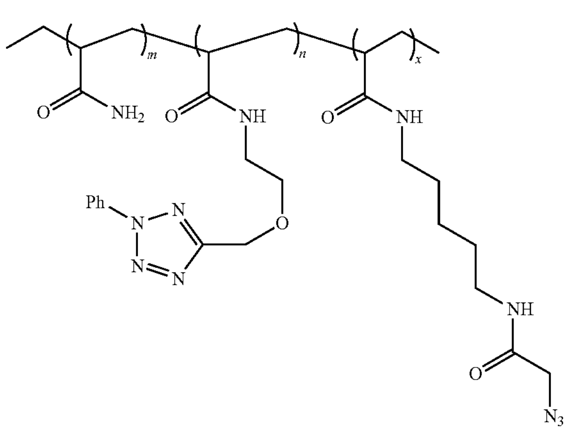

where m is 50 to 100,000, n is 5 to 10,000, and x is 5 to 10,000. Such a polymer may be made in a method including the radical-induced copolymerization reaction:

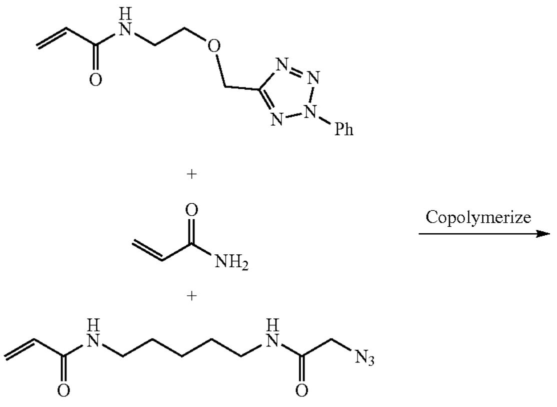

-continued

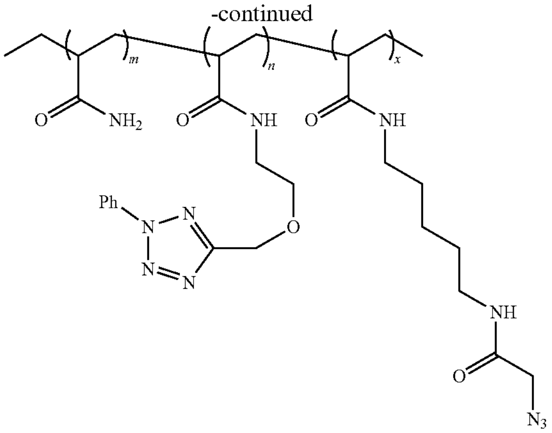

which may be performed as random, blocky, diblock, multiblock, gradient, or other suitable type of copolymerization. The azide may be reacted with a substrate to covalently couple the polymer to the substrate. For example, the polymer may be deposited onto a substrate that includes norbornene groups. The azide ($N_3$) groups of the polymer may be reacted with the norbornene groups to couple the polymer to the substrate, for example using a 1,3-dipolar cycloaddition such as described in U.S. Pat. No. 9,994,687. The tetrazole of such polymer then may be converted to the active moiety, and reacted with azide-coupled oligonucleotides to couple the oligonucleotides to the polymer, and to the substrate, in a manner such as described elsewhere herein.

In some examples, an azide functionalized polymer includes an acrylamide-azidoacrylamide-azirineacrylamide copolymer having the structure:

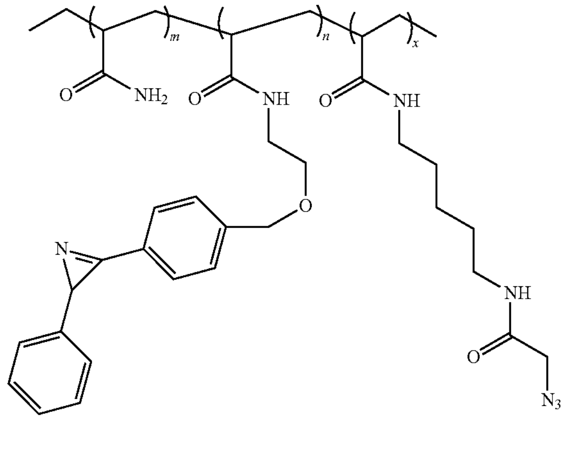

where m is 50 to 100,000, n is 5 to 10,000, and x is 5 to 10,000.

Such a polymer may be made in a method including the radical-induced copolymerization reaction:

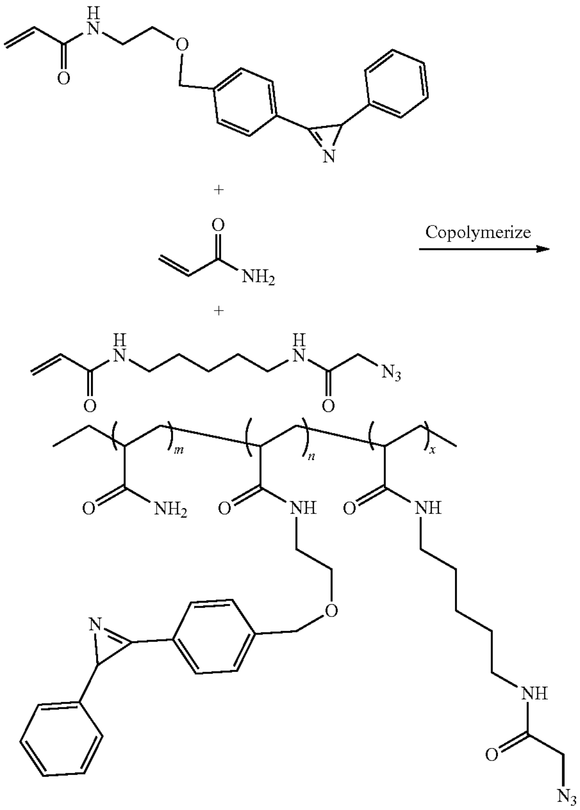

which may be performed as random, blocky, diblock, multiblock, gradient, or other suitable type of copolymerization. The azide may be reacted with a substrate to covalently couple the polymer to the substrate. For example, the polymer may be deposited onto a substrate that includes norbornene groups. The azide ($N_3$) groups of the polymer may be reacted with the norbornene groups to couple the polymer to the substrate, for example using a 1,3-dipolar cycloaddition such as described in U.S. Pat. No. 9,994,687. The 2H-azirine of such polymer then may be converted to the active moiety, and reacted with azide-coupled oligonucleotides to couple the oligonucleotides to the polymer, and to the substrate, in a manner such as described elsewhere herein.

In some examples, a polymer includes a copolymer having the structure:

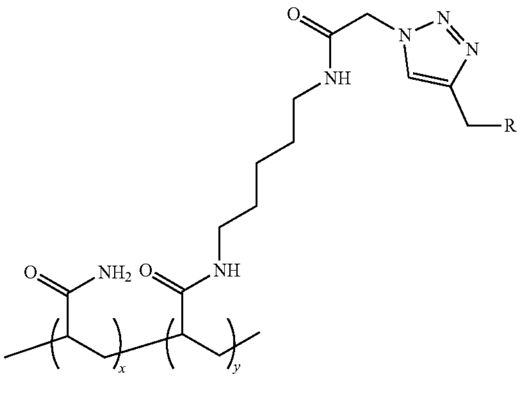

where x is 50 to 100,000, y is 5 to 20,000, and R is selected from the group consisting of a cyclopropenone-masked dibenzocyclooctyne, a tetrazole, a 3-(hydroxymethyl)-2-naphthol, and a 2H-azirine. Nonlimiting examples of such elements are described elsewhere herein.

Such a polymer may be made in a method including the click chemistry reaction of PAZAM with a functionalized alkyne (  ):

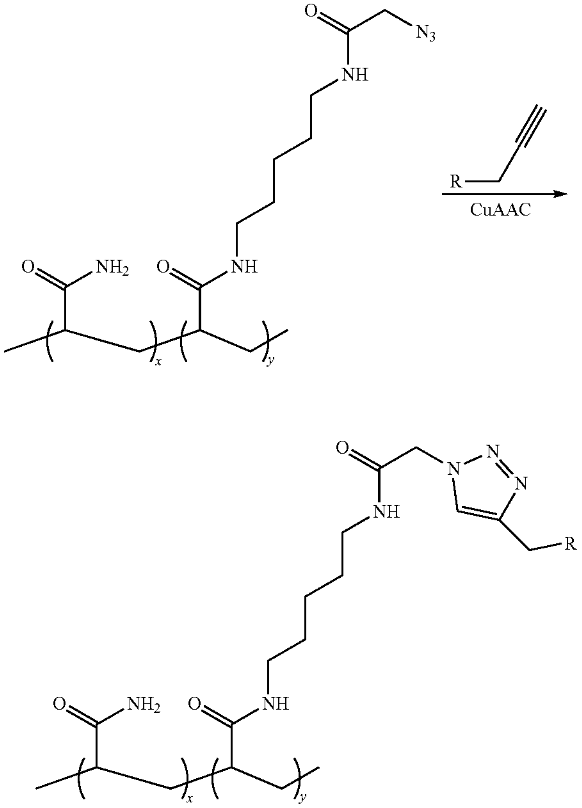

where

is selected from the group consisting of:

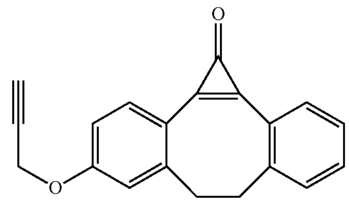,

-continued

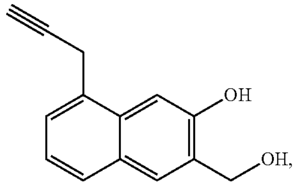

, and

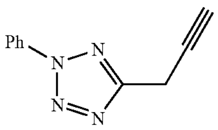

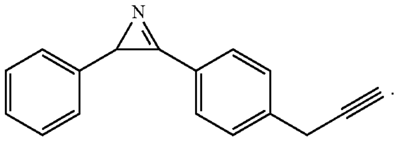

The polymer on the left side of the above click chemistry reaction may be prepared using a radical-induced polymerization similar to that described elsewhere herein. Light may be used to convert the cyclopropenone-masked dibenzocyclooctyne, tetrazole, 3-(hydroxymethyl)-2-naphthol, or 2H-azirine of the polymer to an active moiety; and the active moiety with azide-coupled oligonucleotides to couple the oligonucleotides to the polymer.

In some examples, a copolymer includes a poly(N-(5-azidoacetamidylpentyl) acrylamide-co-acrylamide-co-N-(5-triazolylacetamidylpentyl) acrylamide) polymer having the structure:

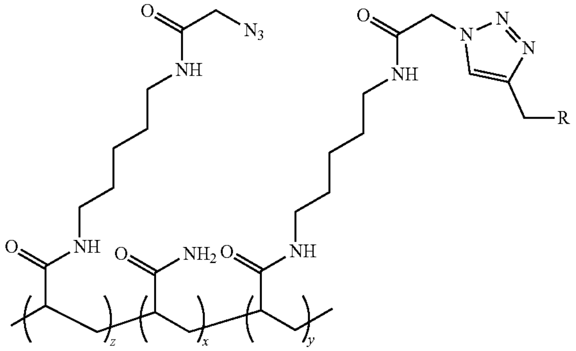

where R is selected from the group consisting of a cyclopropenone-masked dibenzocyclooctyne, a tetrazole, a 3-(hydroxymethyl)-2-naphthol, and a 2H-azirine. Nonlimiting examples of such elements are described elsewhere herein.

Such a polymer may be made in a click chemistry reaction of an azide functional polymer, poly(N-(5-azidoacetamidylpentyl) acrylamide-co-acrylamide), with a functionalized alkyne (  ):

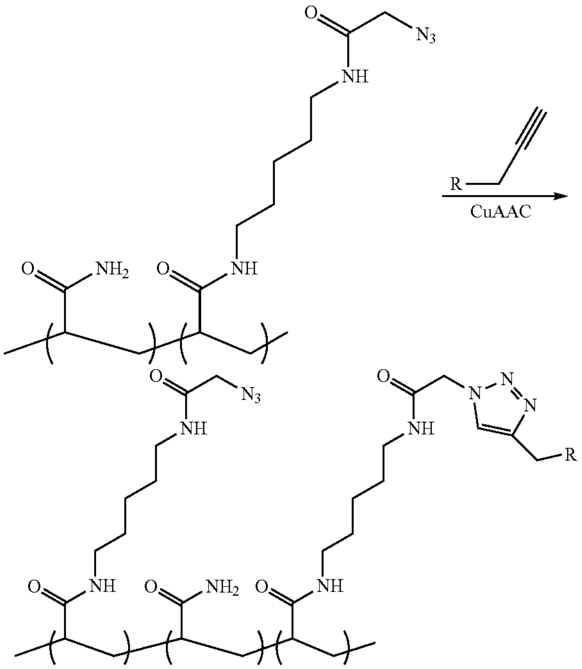

where

is selected from the group consisting of:

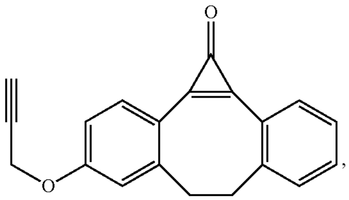

,

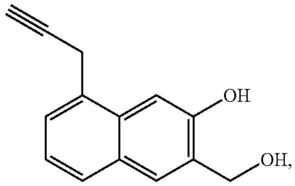

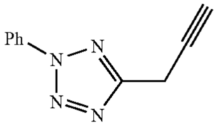

, and

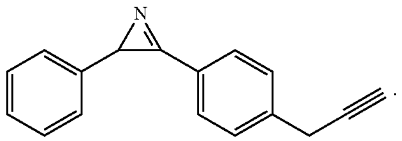

The polymer on the left side of the above click chemistry reaction may be prepared using a radical-induced polymerization similar to that described elsewhere herein. Light may be used to convert the cyclopropenone-masked dibenzocyclooctyne, tetrazole, 3-(hydroxymethyl)-2-naphthol, or 2H-azirine of the polymer to an active moiety; and the active moiety with azide-coupled oligonucleotides to couple the oligonucleotides to the polymer.

It will be appreciated that many different polymers, having many different types of light-activatable moieties, may be envisioned based on the teachings herein. Any of the present polymers may be block co-polymers, may be randomly distributed co-polymers, or any suitable combination of the two. Additionally, it will be appreciated that any suitable azide reactive group, including but not limited to alkyne, may be coupled to the inactive moiety so as to couple the inactive moiety to the polymer.

It will also be appreciated that many different substrates may be functionalized using the present polymers and methods. Illustratively, some examples herein provide a method of making a functional polymer coated surface wherein a norbornene silanized surface,

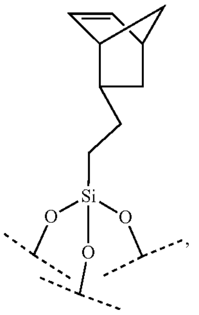

is reacted with azide functional polymer (nonlimiting examples of which are provided elsewhere herein) and then remaining azide groups are reacted with an inactive moiety coupled to an azide reactive group. In one nonlimiting example, the azide reactive group includes an alkyne group. In nonlimiting examples, the inactive moiety is selected from the group consisting cyclopropenone-masked dibenzocyclooctyne, tetrazole, 3-(hydroxymethyl)-2-naphthol, and 2H-azirine. The inactive moiety (e.g., cyclopropenone-masked dibenzocyclooctyne, tetrazole, 3-(hydroxymethyl)-2-naphthol, or 2H-azirine) then may be converted to an active moiety using light, and the active moiety coupled to oligonucleotides in a manner such as described elsewhere herein.

Additional Comments

It will be appreciated that the present polymers, compositions, and methods may be used in any suitable application, such as amplifying a template polynucleotide. For example, although the present compositions may be used to perform "bridge amplification" or "surface-bound polymerase chain reaction," it will be appreciated that the present compositions readily may be adapted for use with other amplification modalities. One such amplification modality is "exclusion amplification," or ExAmp. Exclusion amplification methods may allow for the amplification of a single target polynucleotide per substrate region and the production of a substantially monoclonal population of amplicons in a substrate region. For example, the rate of amplification of the first captured target polynucleotide within a substrate region may be more rapid relative to much slower rates of transport and capture of target polynucleotides at the substrate region. As such, the first target polynucleotide captured in a substrate region may be amplified rapidly and fill the entire substrate region, thus inhibiting the capture of additional target polynucleotide(s) in the same substrate region. Alternatively, if a second target polynucleotide attaches to same substrate region after the first polynucleotide, the relatively rapid amplification of the first target polynucleotide may fill enough of the substrate region to result in a signal that is sufficiently strong to perform sequencing by synthesis (e.g., the substrate region may be at least functionally monoclonal). The use of exclusion amplification may also result in super-Poisson distributions of monoclonal substrate regions; that is, the fraction of substrate regions in an array that are functionally monoclonal may exceed the fraction predicted by the Poisson distribution.

Increasing super-Poisson distributions of useful clusters is useful because more functionally monoclonal substrate regions may result in higher quality signal, and thus improved SBS; however, the seeding of target polynucleotides into substrate regions may follow a spatial Poisson distribution, where the trade-off for increasing the number of occupied substrate regions is increasing the number of polyclonal substrate regions. One method of obtaining higher super-Poisson distributions is to have seeding occur quickly, followed by a delay among the seeded target polynucleotide. The delay, termed "kinetic delay" because it is thought to arise through the biochemical reaction kinetics, gives one seeded target polynucleotide an earlier start over the other seeded targets. Exclusion amplification works by using recombinase to facilitate the invasion of primers (e.g., primers attached to a substrate region) into double-stranded DNA (e.g., a target polynucleotide) when the recombinase mediates a sequence match. The present compositions and methods may be adapted for use with recombinase to facilitate the invasion of the present capture primers and orthogonal capture primers into the present target polynucleotides when the recombinase mediates a sequence match. Indeed, the present compositions and methods may be adapted for use with any surface-based polynucleotide amplification methods such as thermal PCR, chemically denatured PCR, and enzymatically mediated methods (which may also be referred to as recombinase polymerase amplification (RPA) or ExAmp).

While various illustrative examples are described above, it will be apparent to one skilled in the art that various changes and modifications may be made therein without departing from the invention. The appended claims are intended to cover all such changes and modifications that fall within the true spirit and scope of the invention.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

What is claimed is:

1. A method of coupling oligonucleotides to a polymer, the method comprising:

selectively irradiating inactive moieties in a first region of a polymer with light, while not irradiating inactive moieties in a second region of the polymer, to generate first active moieties in the first region of the polymer;

coupling the first active moieties to first oligonucleotides, wherein the first oligonucleotides comprise a mixture of first primers lacking an excision moiety and second primers comprising an excision moiety;

irradiating the inactive moieties in the second region of the polymer with light to generate second active moieties in the second region of the polymer; and coupling the second active moieties to second oligonucleotides, wherein the first region of the polymer comprises a plurality of first subregions, and wherein the second region of the polymer comprises a plurality of second subregions.

2. The method of claim 1, wherein the inactive moieties in the first region of the polymer or in the second region of the polymer comprise a cyclopropenone-masked dibenzocyclooctyne having the structure:

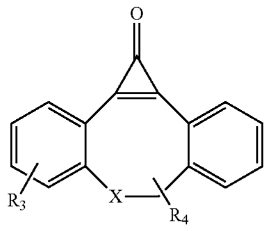

wherein one of $R_3$ and $R_4$ is $R_1$ and the other is H; wherein $R_1$ is a linkage to a backbone of the polymer; and wherein X is $CH_2$, O, S, or NH if $R_4$ is not directly coupled to X, or wherein X is CH or N if $R_4$ is directly coupled to X.

3. The method of claim 2, wherein the first active moieties or the second active moieties comprise a dibenzocyclooctyne:

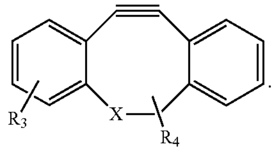

4. The method of claim 3, wherein the first oligonucleotides or second oligonucleotides are coupled to azides ($N_3$) that react with the dibenzocyclooctyne to form a cycloadduct having the structure:

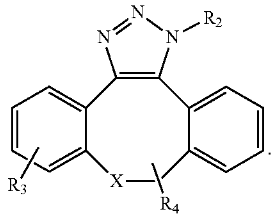

where $R_2$ represents the first oligonucleotides or the second oligonucleotides.

5. The method of claim 1, wherein the inactive moieties in the first region of the polymer or in the second region of the polymer comprise a tetrazole having the structure:

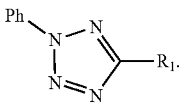

where $R_1$ represents a linkage to a backbone of the polymer.

6. The method of claim 5, wherein the first active moieties or the second active moieties comprise nitrile imines having the structure:

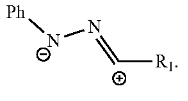

7. The method of claim 6, wherein the first oligonucleotides or second oligonucleotides are coupled to olefins that react with the first active moieties or the second active moieties to form a pyrazoline having the structure:

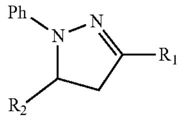

where $R_2$ represents the first oligonucleotides or the second oligonucleotides.

8. The method of claim 1, wherein the inactive moieties in the first region of the polymer or in the second region of the polymer comprise a 3-(hydroxymethyl)-2-naphthol having the structure:

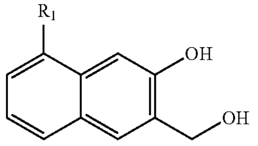

where $R_1$ represents a linkage to a backbone of the polymer.

9. The method of claim 8, wherein the first active moieties or the second active moieties comprise a compound having the structure:

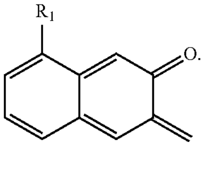

10. The method of claim 9, wherein the first oligonucleotides or second oligonucleotides are coupled to vinyl ethers that react with the first active moieties or the second active moieties to form a benzochroman having the structure:

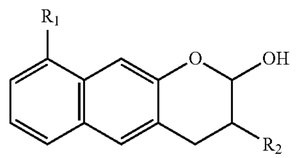

where $R_2$ represents the first oligonucleotides or the second oligonucleotides.

11. The method of claim 1, wherein the inactive moieties in the first region of the polymer or in the second region of the polymer comprise a 2H-azirine having the structure:

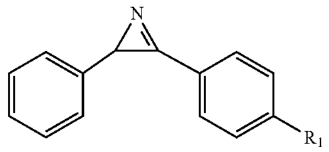

where $R_1$ represents a linkage to a backbone of the polymer.

12. The method of claim 11, wherein the first active moieties or the second active moieties comprise a nitrile ylide having the structure:

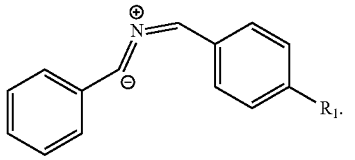

13. The method of claim 12, wherein the first oligonucleotides or second oligonucleotides are coupled to olefins that react with the first active moieties or the second active moieties to form a pyrroline having the structure:

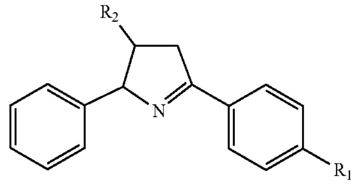

where $R_2$ represents the first oligonucleotides or the second oligonucleotides.

14. The method of claim 1, wherein the second oligonucleotides comprise a mixture of third primers comprising an excision moiety and fourth primers lacking an excision moiety.

15. The method of claim 14, wherein the first and third primers have the same sequence as one another except for the excision moiety, and wherein the second and fourth primers have the same sequence as one another except for the excision moiety.

16. The method of claim 14, wherein the sequences of the first and second primers are orthogonal to one another, and wherein the sequences of the third and fourth primers are orthogonal to one another.

17. The method of claim 1, wherein each of the first subregions is contiguous with a corresponding one of the second subregions.

18. The method of claim 17, wherein each of the first subregions, and the corresponding one of the second subregions within which that first subregion is continuous, is located within a well.

19. The method of claim 1, further comprising:

depositing photoresist over the first and second regions;

while selectively irradiating the inactive moieties in the first region of the polymer with light and while not irradiating the inactive moieties in the second region of the polymer, irradiating the photoresist over the first region with light;

before coupling the first active moieties to the first oligonucleotides, removing the irradiated photoresist from the first region of the polymer; and before coupling the second active moieties to the second oligonucleotides, removing the photoresist from the second region of the polymer.

20. The method of claim 19, wherein the irradiated photoresist is removed from the first region of the polymer and the photoresist is removed from the second region of the polymer in a common step as one another.

21. A polymer, comprising a poly(cyclopropenone-masked dibenzocyclooctyne-acrylamide-co-acrylamide) copolymer having the structure:

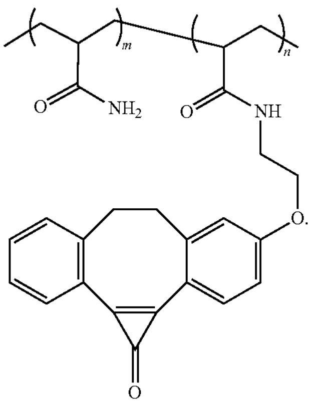

22. A polymer, comprising a poly(dibenzocyclooctyne-acrylamide-co-acrylamide) copolymer having the structure:

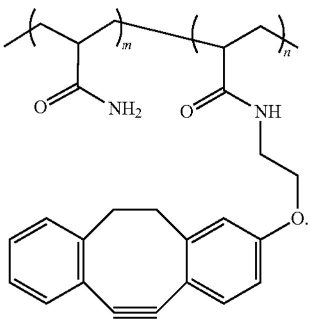

* * * * *